US008147323B2

(12) United States Patent
Joshi et al.

(10) Patent No.: US 8,147,323 B2

(45) Date of Patent: *Apr. 3, 2012

(54) GAMING MACHINE WITH VISUAL AND AUDIO INDICIA CHANGED OVER TIME

(75) Inventors: Shridhar P. Joshi, Naperville, IL (US); David K. Locke, Chicago, IL (US); Marc A. Raneses, Elk Grove Village, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/099,154

(22) Filed: May 2, 2011

(65) Prior Publication Data

US 2011/0207521 A1 Aug. 25, 2011

Related U.S. Application Data

(63) Continuation of application No. 12/652,651, filed on Jan. 5, 2010, now Pat. No. 7,934,989, which is a continuation of application No. 11/227,870, filed on Sep. 15, 2005, now Pat. No. 7,666,091, which is a continuation of application No. 10/093,673, filed on Mar. 8, 2002, now Pat. No. 6,960,136, which is a continuation-in-part of application No. 09/922,453, filed on Aug. 3, 2001, now Pat. No. 6,974,385, which is a continuation-in-part of application No. 09/679,093, filed on Oct. 4, 2000, now Pat. No. 6,939,226.

(51) Int. Cl.

| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl. .................. 463/25; 463/7; 463/20; 463/23; 463/27

(58) Field of Classification Search ........................ None
See application file for complete search history.

(56) References Cited

U.S. PATENT DOCUMENTS 3,533,629 A 10/1970 Raven .......................... 273/138

(Continued)

FOREIGN PATENT DOCUMENTS

AU 199943487 A1 3/2000

(Continued)

OTHER PUBLICATIONS

Who Dunnit™ Brochure, WMS Gaming Inc., 2 pages (no date).

(Continued)

*Primary Examiner* — Paul A D'Agostino

(74) *Attorney, Agent, or Firm* — Nixon Peabody LLP

(57) ABSTRACT

A gaming machine having features for increasing player appeal is set forth. The machine generally includes a processor, a display, and a memory device. The processor randomly selects one of a plurality of outcomes of the gaming machine in response to a wager. The display displays visual elements to be viewed by the player. The memory device is coupled to the processor and stores at least two data sets for producing at least two different types of visual and/or audio elements in the basic game or bonus game, or at least two different types of bonus game formats. The processor selects one of the two data sets in response to the occurrence of a predetermined time, a number of wager inputs by players of the gaming machine, or after determining a favorite play content based on the number of wager inputs by players.

36 Claims, 18 Drawing Sheets

U.S. PATENT DOCUMENTS

| | | | | |
|---|---|---|---|---|
| 5,370,399 | A | 12/1994 | Liverance | 273/434 |
| 5,393,073 | A | 2/1995 | Best | 273/434 |
| 5,524,888 | A | 6/1996 | Heidel | 463/22 |
| 5,533,727 | A | 7/1996 | DeMar | 463/23 |
| 5,655,961 | A | 8/1997 | Acres et al. | 463/27 |
| 5,833,538 | A | 11/1998 | Weiss | 463/21 |
| 5,876,284 | A * | 3/1999 | Acres et al. | 463/25 |
| 5,892,519 | A | 4/1999 | Hirai | 345/440 |
| 5,941,773 | A | 8/1999 | Harlick | 463/26 |
| 5,959,277 | A | 9/1999 | Lucero | 235/380 |
| 5,971,850 | A * | 10/1999 | Liverance | 463/23 |
| 6,050,895 | A * | 4/2000 | Luciano et al. | 463/7 |
| 6,068,552 | A | 5/2000 | Walker et al. | 463/21 |
| 6,110,041 | A * | 8/2000 | Walker et al. | 463/20 |
| 6,146,273 | A * | 11/2000 | Olsen | 463/27 |
| 6,159,097 | A * | 12/2000 | Gura | 463/20 |
| 6,162,121 | A | 12/2000 | Morro et al. | 463/16 |
| 6,190,255 | B1 * | 2/2001 | Thomas et al. | 463/20 |
| 6,203,429 | B1 * | 3/2001 | Demar et al. | 463/20 |
| 6,224,484 | B1 * | 5/2001 | Okuda et al. | 463/27 |
| 6,234,897 | B1 * | 5/2001 | Frohm et al. | 463/20 |
| 6,254,483 | B1 * | 7/2001 | Acres | 463/26 |
| 6,315,662 | B1 * | 11/2001 | Jorasch et al. | 463/20 |
| 6,319,125 | B1 * | 11/2001 | Acres | 463/25 |
| 6,390,473 | B1 * | 5/2002 | Vancura et al. | 273/292 |
| 6,439,994 | B2 * | 8/2002 | Tsukahara | 463/20 |
| 6,471,208 | B2 * | 10/2002 | Yoseloff et al. | 273/143 R |
| 6,699,122 | B1 * | 3/2004 | Osawa | 463/20 |
| 6,988,732 | B2 * | 1/2006 | Vancura | 273/274 |
| 7,294,058 | B1 * | 11/2007 | Slomiany et al. | 463/31 |
| 7,934,989 | B2 * | 5/2011 | Joshi et al. | 463/20 |
| 2001/0004607 | A1 * | 6/2001 | Olsen | 463/26 |
| 2001/0009865 | A1 * | 7/2001 | Demar et al. | 463/20 |
| 2002/0010016 | A1 * | 1/2002 | Tsukahara | 463/20 |
| 2002/0043759 | A1 * | 4/2002 | Vancura | 273/139 |
| 2002/0142846 | A1 * | 10/2002 | Paulsen | 463/43 |
| 2003/0027622 | A1 * | 2/2003 | Osawa | 463/20 |
| 2004/0162129 | A1 * | 8/2004 | Nelson | 463/16 |

FOREIGN PATENT DOCUMENTS

| | | | |
|---|---|---|---|
| EP | 0 945 837 | A2 | 9/1999 |
| EP | 0 945 837 | A3 | 9/1999 |
| EP | 0 984 407 | A2 | 3/2000 |
| EP | 0 984 407 | A3 | 3/2000 |
| EP | 0 984 409 | A2 | 3/2000 |
| EP | 0 984 409 | A3 | 3/2000 |
| EP | 1 067 491 | A2 | 1/2001 |
| EP | 1 067 491 | A3 | 1/2001 |
| EP | 1 076 321 | A1 | 2/2001 |
| EP | 1 082 979 | A2 | 3/2001 |
| EP | 1 082 979 | A3 | 3/2001 |
| EP | 1 083 531 | A1 | 3/2001 |
| WO | WO 99/19037 | | 4/1999 |

OTHER PUBLICATIONS

Weinert, Joe, “Entertainment Vehicles,” IGWB New ’97 Games, 7 pages (Mar. 1997).

* cited by examiner

*Fig. 10*

| SELECTION IN WHICH GUILTY CHARACTER IS FOUND | PRIMARY BONUS (VALUE IS MULTIPLIED BY NUMBER OF ACTIVE PAYLINES) |
|---|---|
| 1 | 250 |
| 2 | 200 |
| 3 | 150 |
| 4 | 100 |
| 5 | 80 |
| 6 | 70 (UNAVAILABLE WHEN THREE SIDEKICK SYMBOLS IN START-BONUS OUTCOME) |
| 7 | 50 (UNAVAILABLE WHEN TWO OR MORE SIDEKICK SYMBOLS IN START-BONUS OUTCOME) |
| 8 | 30 (UNAVAILABLE WHEN ONE OR MORE SIDEKICK SYMBOLS IN START-BONUS OUTCOME) |

*Fig. 11*

| SELECTION IN WHICH HIDING PLACE IS FOUND | MULTIPLIER (APPLIED TO TOTAL BONUS PAYOUT TO THAT POINT IN THE BONUS GAME) |
|---|---|
| 1 | X8 |
| 2 | X5 |
| 3 | X4 |
| 4 | X3 |
| 5 | X2 |

*Fig. 21*
THE RESTAURANT
15x
20x
LOVERS LANE
COMPLIMENT HER
COMPLIMENT HIM
ASK ABOUT HIS FAMILY
ASK HER ABOUT HER FAMILY
MAKE A MOVE ON HIM
MAKE A MOVE ON HER
Love Meter

GAMING MACHINE WITH VISUAL AND AUDIO INDICIA CHANGED OVER TIME

RELATED APPLICATION

This application is a continuation of U.S. patent application Ser. No. 12/652,651, filed Jan. 5, 2010, now allowed, which is a continuation of U.S. patent application Ser. No. 11/227,870, filed Sept. 15, 2005, now issued as U.S. Pat. No. 7,666,091, which is a continuation of U.S. patent application Ser. No. 10/093,673, filed on Mar. 8, 2002, now issued as U.S. Pat. No. 6,960,136, which is a continuation-in-part of U.S. patent application Ser. No. 09/922,453, filed Aug. 3, 2001, now issued as U.S. Pat. No. 6,974,385, which is a continuation-in-part of U.S. Patent application Ser. No. 09/679,093, filed Oct. 4, 2000, now issued as U.S. Pat. No. 6,939,226, all of which are here incorporated by reference in their entireties.

FIELD OF THE INVENTION

The present invention relates generally to gaming machines and, more particularly, to a gaming machine having visual and sound indicia that are automatically modified as a function of real time, such as the time of day, the season of the year, or a holiday season.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, shrewd operators strive to employ the most entertaining and exciting machines available because such machines attract frequent play and, hence, increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept, which has been successfully employed to enhance the entertainment value of a game is that of a "secondary" or "bonus" game which may be played in conjunction with a "basic" game. The bonus game may comprise any type of game, either similar to or completely different from the basic game, which is entered upon the occurrence of a selected event or outcome of the basic game. Such a bonus game produces a significantly higher level of player excitement than the basic game because it provides a greater expectation of winning than the basic game and is accompanied by more attractive or unusual video displays and/or audio.

While the bonus game concept offers advantages of player appeal and excitement relative to other known games, there is a continuing need to develop new features for gaming machines to satisfy the demands of players and operators. Preferably, such new features will maintain, or even further enhance, the level of player excitement offered by bonus games heretofore known in the art. The present to invention is directed to satisfying these needs.

SUMMARY OF THE INVENTION

A gaming machine includes a processor, a display, and a memory device. The processor monitors time signals from a clock and randomly selects one of a plurality of outcomes of the gaming machine in response to a wager amount. The display displays visual elements to be viewed by the player. The memory device is coupled to the processor and stores at least two data sets for producing at least two different types of visual elements. The processor selects one of at least two data sets in response to the processor monitoring a time signal corresponding to a predetermined time. The two different types of visual elements may be of a standard motif and a holiday motif, and the predetermined time is the holiday or one or more days before and/or after the holiday. The holiday may be one of many widely recognized societal holidays, such as Valentine's Day, St. Patrick's Day, Mardi Gras, Easter, the $4^{th}$ of July, Halloween, Thanksgiving, Christmas, New Year's Eve, and New Year's Day.

Alternatively, the predetermined time can be at least one minute within one day, and the corresponding visual elements can be related to the time of day. The predetermined time can also be a season of the year, and the corresponding visual elements can be indicative of that season.

In other alternatives, the gaming machine includes audio speakers and audio elements can replace the visual elements, or audio and visual elements can be displayed in unison as a function of the time.

The present invention also contemplates several novel methods of operating a gaming machine that is controlled by a processor to increase player appeal. For example, one method includes the steps of displaying a plurality of standard visual elements, monitoring real time, and displaying a plurality of modified visual elements in response to the real time being a predetermined time. The plurality of modified visual elements have a theme that is indicative of a commonly known societal event associated with the predetermined time.

In a further alternative to maintain player appeal, the gaming machine performs the steps of providing a standard payout structure having a payback percentage, monitoring real time, and replacing, in response to the real time being a predetermined time, the standard payout structure with a modified payout structure. The modified payout structure has a payback percentage that is the same as the standard payout structure.

In yet a further alternative, the method includes storing a plurality of visual element data sets in a memory device to be accessed by the processor with each of the plurality of visual element data sets corresponding to a different visual element motif, is displaying each of the visual element motifs for a selected period of time while the gaming machine is operational, and determining which one of the visual element motifs is the favorite by monitoring, with the controller, wager inputs while each of the visual element motifs is activated. Once the favorite is known, then the machine displays the favorite visual element motif for a larger portion of the total operating time. This player appeal monitoring system can be expanded such that each machine in a bank of common machines displays different visual element motifs. The visual element motif of the machine(s) which is the favorite, as measured by wager inputs, is then displayed on more of the machines in the bank.

In addition to altering the motif of the gaming machine, the present invention also contemplates altering the bonus game format at a certain time, after a certain number of wager inputs, or after determining which bonus game format is a favorite among players based on the number of wager inputs.

The above summary of the present invention is not intended to represent each embodiment or every aspect of the present invention. This is the purpose of the Figures and the detailed description which follow.

BRIEF DESCRIPTION OF THE DRAWINGS

The foregoing and other advantages of the invention will become apparent upon reading the following detailed description and upon reference to the drawings.

FIG. 10 is a pay table for a primary bonus awarded for finding a guilty character from suspects shown on the display screen capture in FIGS. 5-8, where the number of suspects depends upon the start-bonus outcome that triggered the bonus game.

FIG. 11 is a multiplier table for a payout multiplier for finding a hiding place of the guilty character in a hideout shown on the display screen capture in FIG. 9, where the number of hiding places depends upon the start-bonus outcome that triggered the bonus game.

Figure 1:
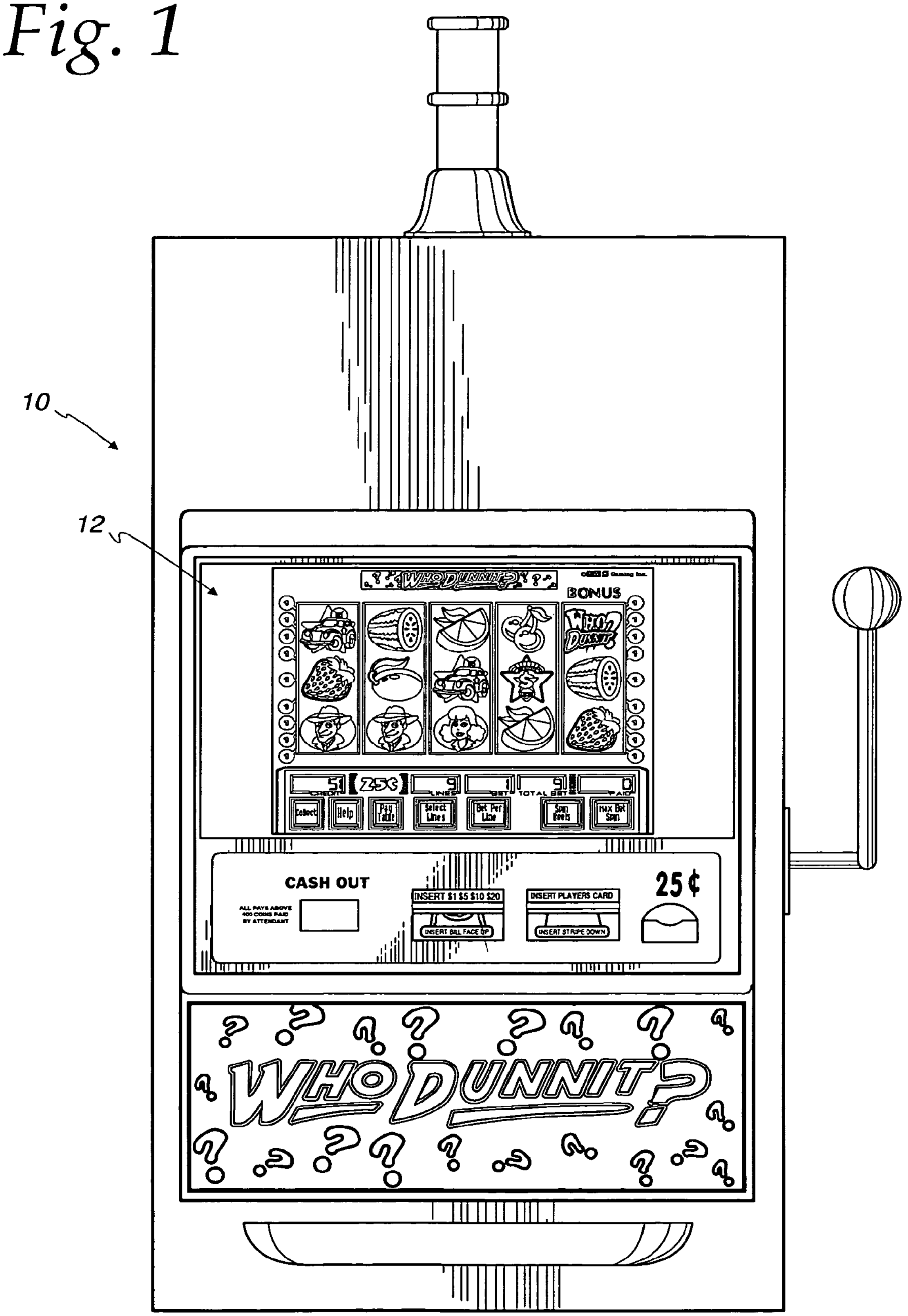
FIG. 1 is a simplified front view of a slot machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, a video gaming machine 10 is depicted that may be used to implement a bonus game according to the present invention. The gaming machine 10 includes a video display 12 that may comprise a dot matrix, CRT, LED, LCD, electro-luminescent display, or generally any type of video display known in the art. In the illustrated embodiment, the gaming machine 10 is an "upright" version in which the video display 12 includes a touch screen and is oriented vertically relative to the player. It will be appreciated, however, that any of several other models of gaming machines are within the scope of the present invention, including, for example, a "slant-top" version in which the video display is slanted at about a 30° angle toward the player, or gaming machines that include mechanical, rather than video, displays.

In one embodiment, the gaming machine 10 is operable to play a game entitled WHO DUNNIT?™ having a mystery theme. The WHO DUNNIT?™ game features a basic game in the form of a slot machine with five simulated spinning reels (see FIG. 3) and a bonus game with strategy options directing game activities on the video display 12. It will be appreciated, however, that the gaming machine 10 may be implemented with games other than the WHO DUNNIT?™ game and/or with several alternative game themes.

Figure 2:
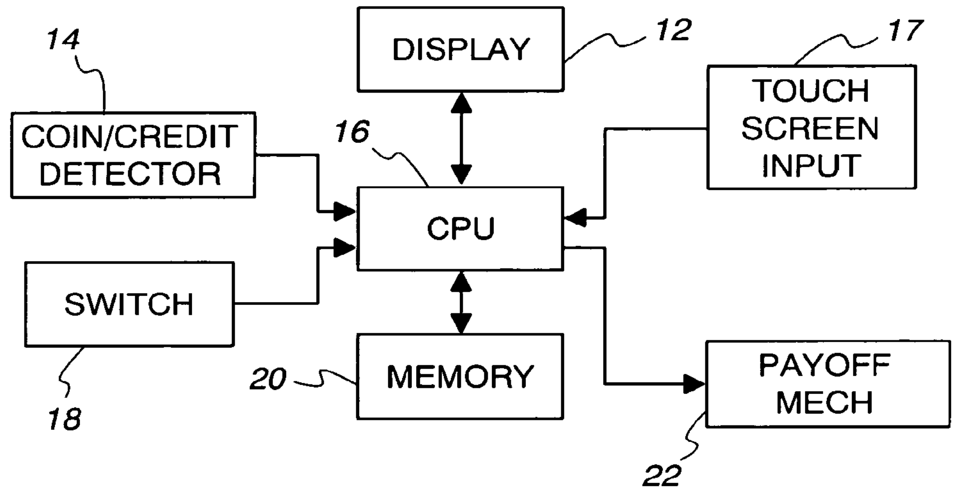
FIG. 2 is a block diagram of a control system suitable for operating the gaming machine in FIG. 1.

FIG. 2 is a block diagram of a control system suitable for operating the gaming machine 10. Coin/credit detector 14 signals a CPU 16 when a player has inserted a number of coins or played a number of credits. Then, the CPU 16 executes a game program which causes the video display 12 to display the basic game that includes simulated reels with symbols displayed thereon (see FIG. 3). The player may select the number of paylines to play and the amount to wager via touch screen input keys 17. The basic game commences in response to the player activating a switch 18 (e.g., by pulling a lever or pushing a button), causing the CPU 16 to set the reels in motion, randomly select a game outcome, and then stop the reels to display symbols corresponding to the pre-selected game outcome. In one embodiment, certain basic game outcomes cause the CPU 16 to enter a bonus mode, which causes the video display 12 to show a bonus game. The display screens associated with the WHO DUNNIT™ bonus game will be described in detail in relation to FIGS. 5-9.

A system memory 20 stores control software, operational instructions, and data associated with the gaming machine 10. In one embodiment, the system memory 20 comprises a separate read-only memory (ROM) and battery-backed random-access memory (RAM). It will be appreciated, however, that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes which may occur in the basic game or bonus game. The payoff amounts corresponding to certain combinations of symbols in the basic game are predetermined according to a pay table stored in system memory 20. The payoff amounts corresponding to certain outcomes of the bonus game are also stored in system memory 20.

Figure 3:
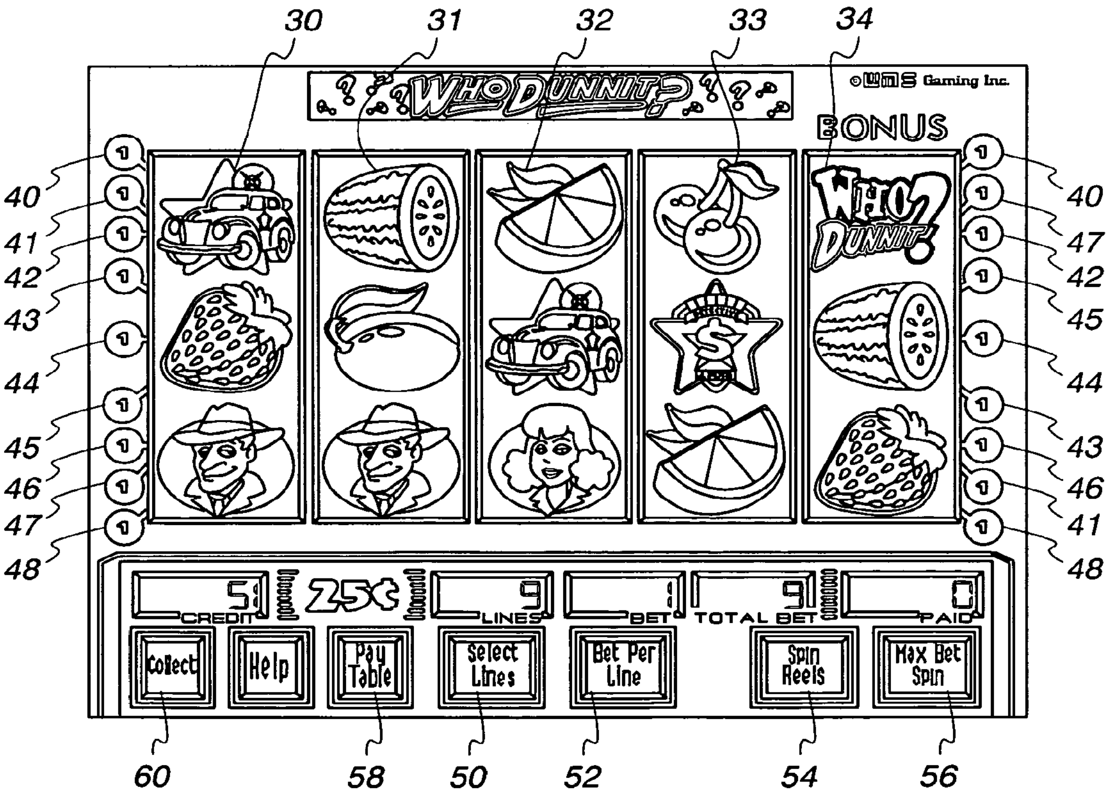
FIG. 3 is a display screen capture associated with a five-reel, nine-line basic game that is played on the gaming machine in FIG. 1.

As shown in FIG. 3, the WHO DUNNIT?™ basic game is implemented on the video display 12 on five video simulated spinning reels 30, 31, 32, 33, 34 (hereinafter "reels") with nine paylines 40-48. Each of the paylines 40-48 extends through one symbol on each of the five reels 30-34. Generally, game play is initiated by inserting a number of coins or playing a number of credits, causing the CPU 16 (FIG. 2) to activate a number of paylines corresponding to the number of coins or credits played. In one embodiment, the player selects the number of paylines (between one and nine) to play by pressing a "Select Lines" key 50 on the video display 12. The player then chooses the number of coins or credits to bet on the selected paylines by pressing the "Bet Per Line" key 52.

After activation of the paylines, the reels 30-34 may be set in motion by touching the "Spin Reels" key 54 or, if the player wishes to bet the maximum amount per line, by using the "Max Bet Spin" key 56 on the video display 12. Alternatively, other mechanisms, such as, for example, a lever or push button, may be used to set the reels in motion. The CPU 16 uses a random number generator (not shown) to select a game outcome (e.g., "basic" game outcome) corresponding to a particular set of reel "stop positions." The CPU 16 then causes each of the video reels 30-34 to stop at the appropriate stop position. Video symbols are displayed on the reels 30-34 to graphically illustrate the reel stop positions and indicate whether the stop positions of the reels represent a winning game outcome. Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30-34 along an active payline correspond to one of the winning combinations on the pay table. If the displayed symbols stop in a winning combination, the game credits the player with an amount corresponding to the award in the pay table for that combination multiplied by the amount of credits bet on the winning payline. The player may collect the amount of accumulated credits by pressing the "Collect" button 60.

Figure 4A:
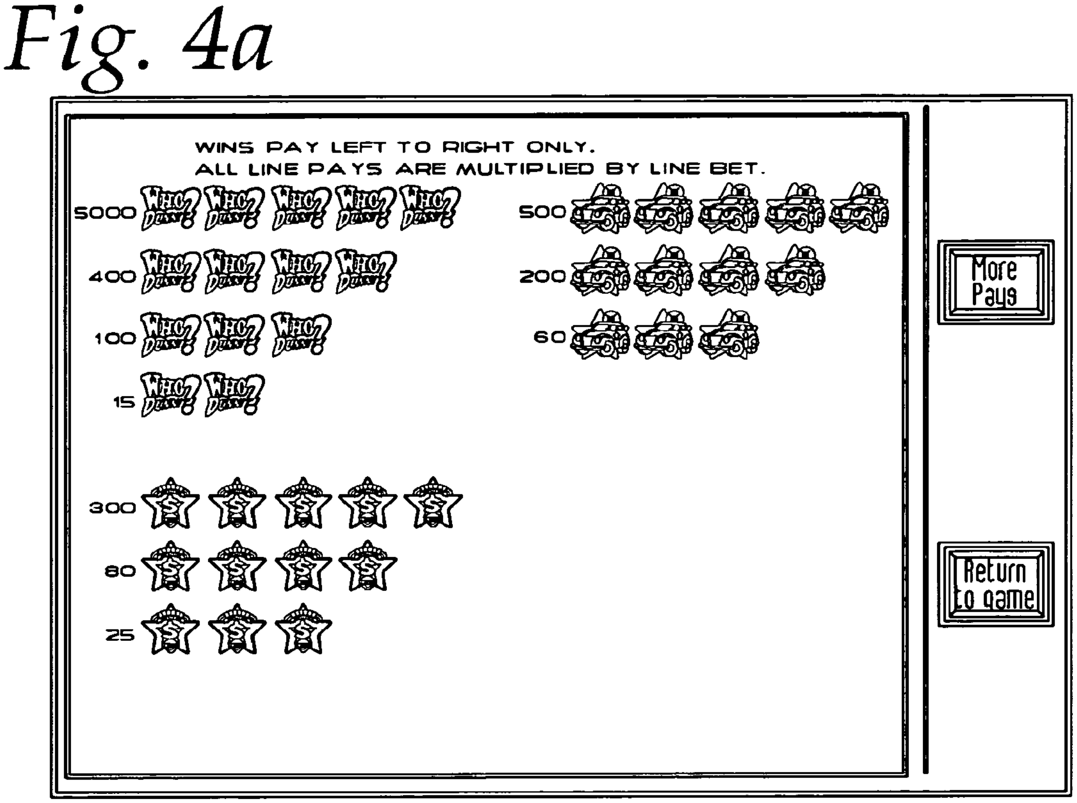
FIGS. 4*a* and 4*b* are a pay table for various winning symbol combinations that may occur in the basic game of the gaming machine in FIG. 1.
Figure 4B:
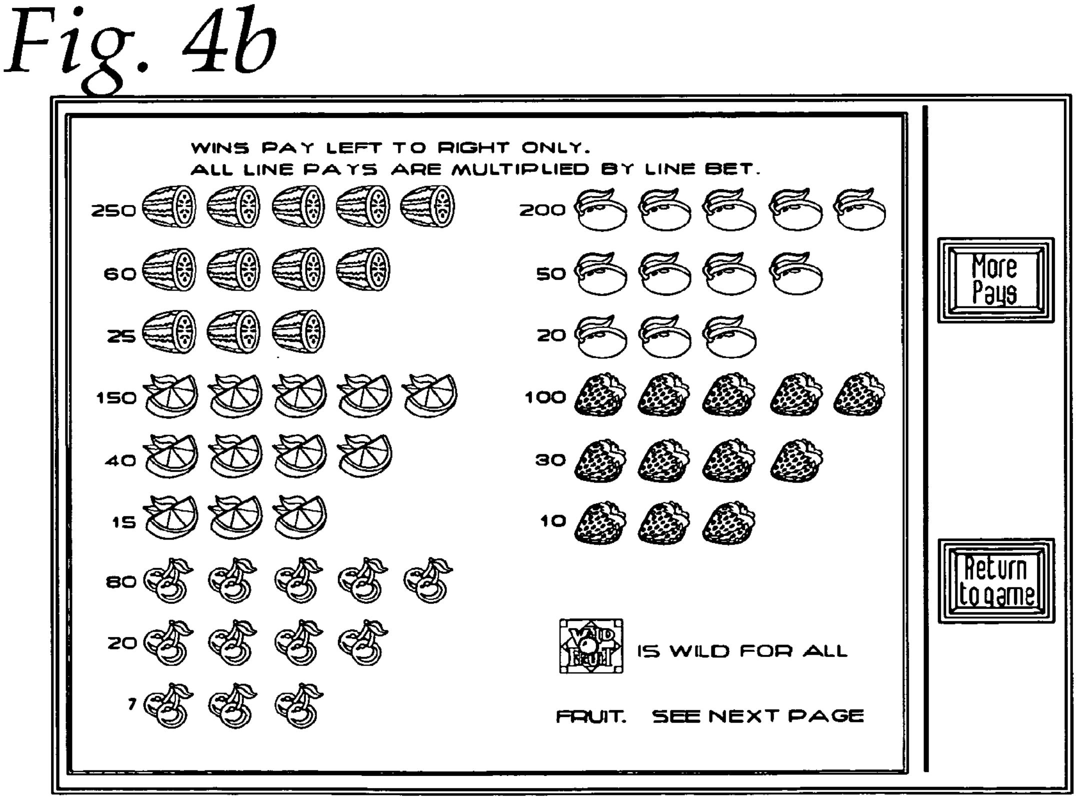

FIGS. 4*a* and 4*b* depict the pay table for the WHO DUNNIT?™ basic game. The pay table enables the player to view the winning combinations and their associated payoff amounts. From the pay table, it can be seen that the WHO DUNNIT?™ basic game includes the following reel symbols that can lead to a payoff in the basic game: WHO DUNNIT, DETECTIVE CAR, BADGE, CHERRY, MELON, PLUM, ORANGE, STRAWBERRY, and MAGNIFYING GLASS.

Included among the plurality of basic game outcomes are a plurality of different start-bonus outcomes for starting play of a bonus game. A start-bonus outcome may be defined in any number of ways. For example, a start-bonus outcome occurs when a special start-bonus symbol or a special combination of symbols appears on one or more of the reels 30-34 in any predetermined display position. The appearance of a start-bonus outcome causes the processor to shift operation from the basic game to a bonus game.

The WHO DUNNIT?™ bonus game is triggered by lining up three DETECTIVE symbols, three SIDEKICK symbols, or any mix of three of these start-bonus symbols on an active payline. In other words, the start-bonus outcomes are the following combinations of start-bonus symbols appearing, in any order, on an active payline: (1) DETECTIVE, DETECTIVE, DETECTIVE; (2) DETECTIVE, DETECTIVE, SIDEKICK; (3) DETECTIVE, SIDEKICK, SIDEKICK; and (4) SIDEKICK, SIDEKICK, SIDEKICK. In FIG. 3, for example, the combination DETECTIVE (reel 30), DETECTIVE (reel 31), and SIDEKICK (reel 32) is on the payline 46. If that payline is active, the bonus game would be triggered. In the illustrated embodiment, the DETECTIVE and SIDEKICK symbols do not appear in the pay table in FIG. 4 and, therefore, cannot generate a winning basic game outcome. These symbols do, however, provide start-bonus outcomes for triggering the WHO DUNNIT?™ bonus game.

Figure 5:
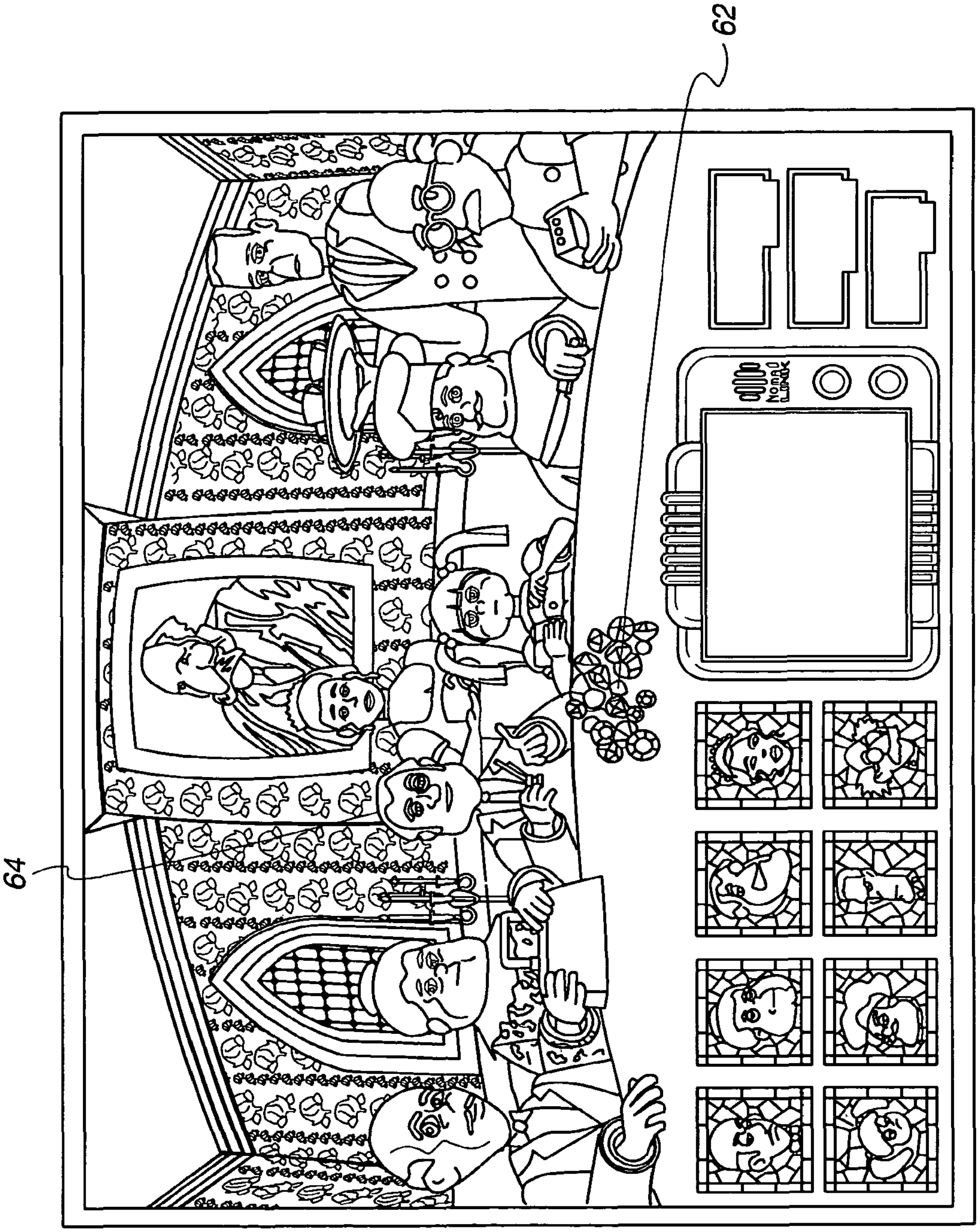
FIGS. 5-9 are display screen captures associated with a bonus game with mystery.

In response to starting the WHO DUNNIT?™ bonus game, the video display shows the bonus game screen in FIG. 5. The scene on the bonus screen includes eight different characters around a table, some seated and some standing. The characters may, for example, include a Shady Lawyer, Butler, French Maid, Italian Chef, Old Lady (the Widow), Accountant, Professor (Mad Scientist), and Little Girl. Placed in the center of the table will be some item of value 62. The scene may be of a will being read by an attorney and all the appropriate members have been gathered to divide up the estate. In summary, the item is stolen by one of the members at the table and a player of the gaming machine becomes the detective who must now solve this crime. The object for the player is to take as few selections as possible to reveal the guilty character to the rest of the group. The fewer the selections, the greater the bonus.

Prior to the item being stolen, the characters are in a NORMAL MODE. The characters may "blink" their eyes but, essentially, they carry expressions of indifference. The Shady Lawyer 64 then gives a short introductory speech like "[w]e're here to distribute the estate of . . ." During this speech, one or two of the characters may wink to give the player a false sense of knowledge about who committed the crime.

After the Shady Lawyer 64 finishes his speech, the video display turns black to indicate a "blackout" and then lightning flashes through windows. The light generated from the lightning highlights the characters. The player hears a scream, footsteps, and a door slam, at which time the screen fades back up to its normal lighting. The item that had been in the center of the table is now missing.

Figure 6:
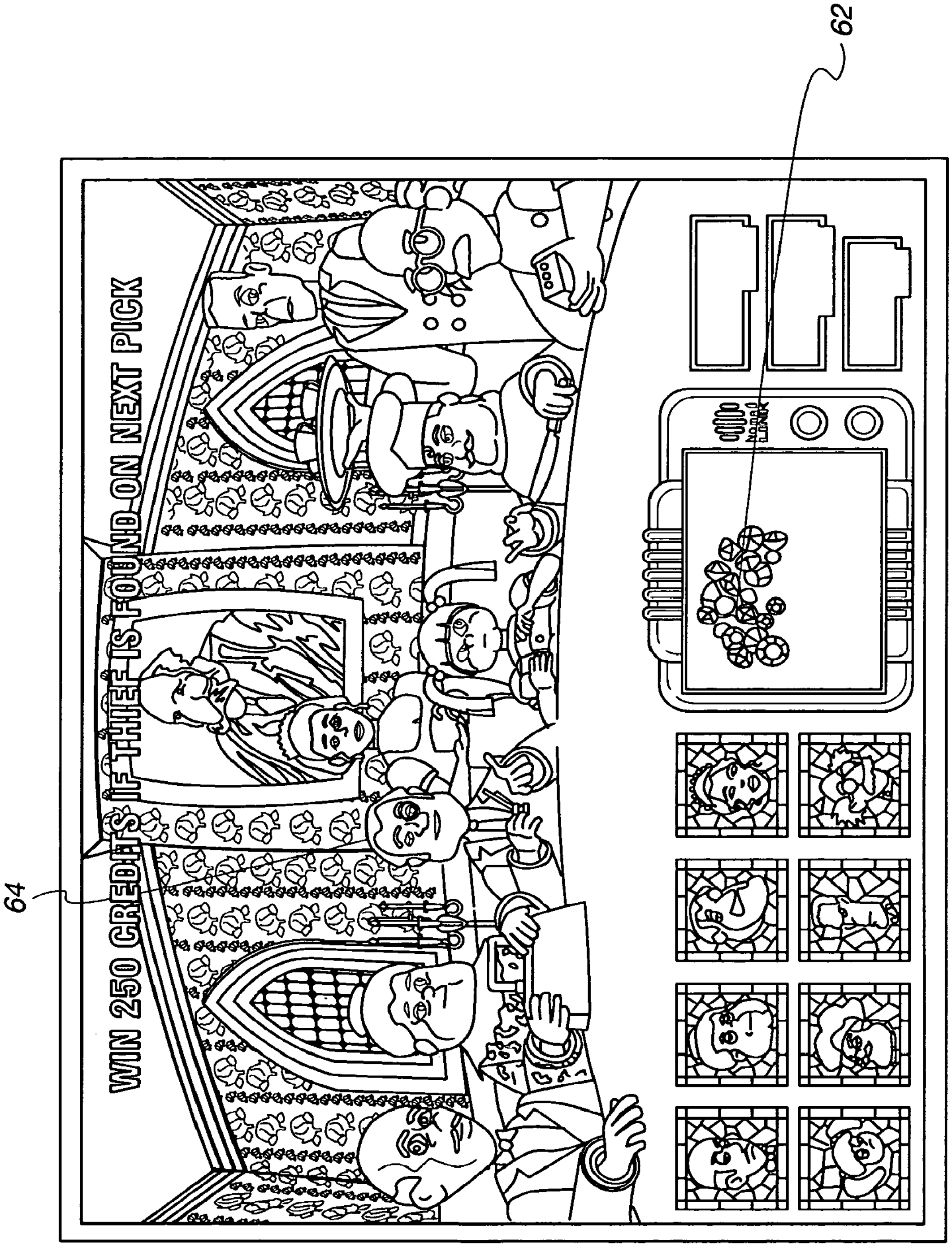

FIG. 6 depicts the bonus game screen after the item has been stolen. The characters are now in a SUSPECT MODE. In this mode, the characters have suspicious facial expressions with shifting eyes which avoid eye contact with the player. Some of the characters may perform some kind of idle animation to make them appear guilty. For example, the Italian Chef may fiddle with his knife, the Old Lady may clench her purse, the Professor may click his stopwatch, the Little Girl may play with her teddy bear, and the Shady Lawyer may tap a pen on his hand.

Figure 7:
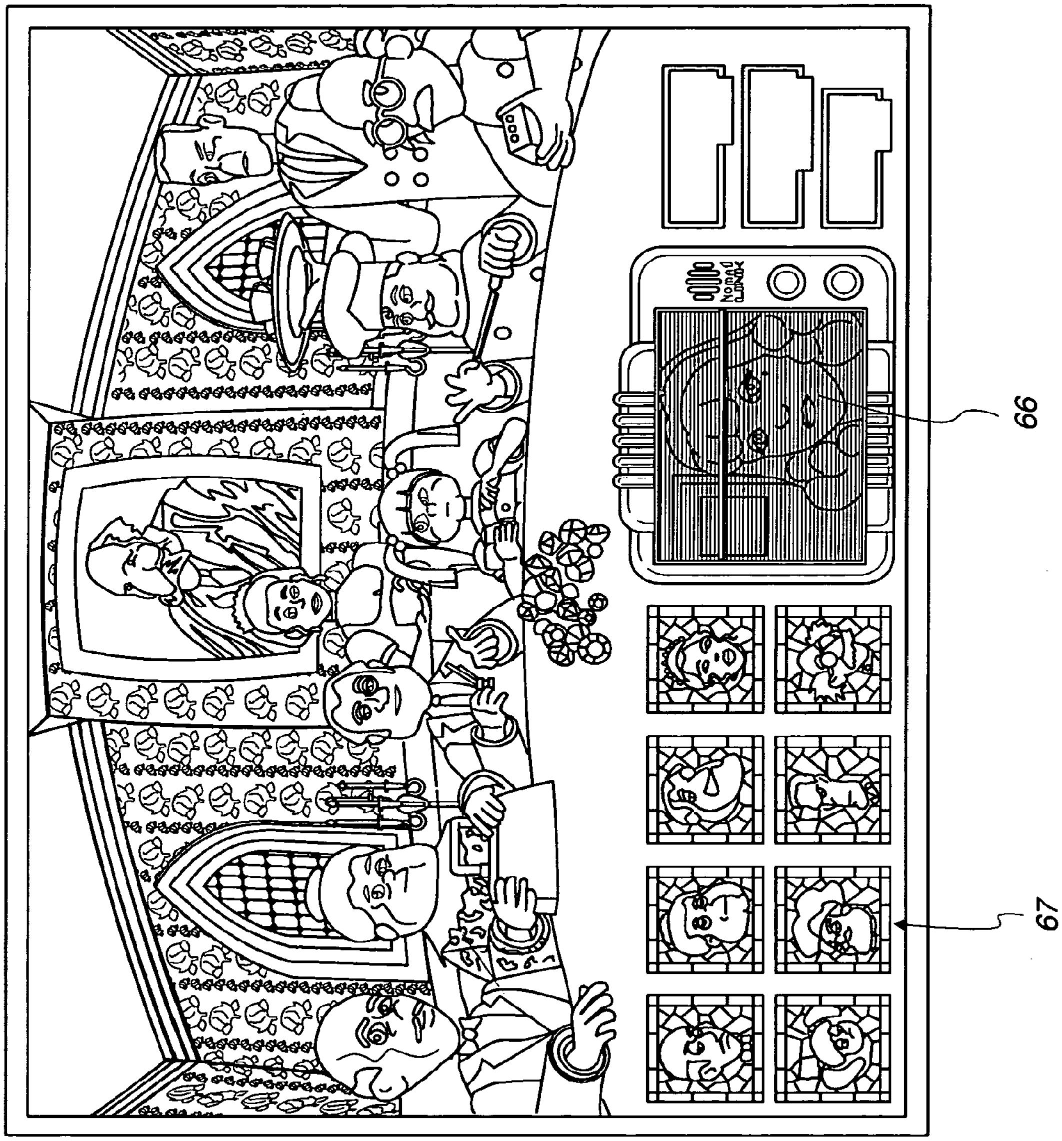

Referring to FIG. 7, if the WHO DUNNIT?™ bonus game was triggered by a start-bonus outcome including one or more SIDEKICK symbols, then a sidekick character 66 appears on the video display. At this time, the sidekick character 66 eliminates X number of characters by proclaiming them innocent and removing them from the suspect list, where X is equal to the number of SIDEKICK symbols in the start-bonus outcome that triggered the bonus game. For example, if the start-bonus outcome was the combination DETECTIVE, DETECTIVE, SIDEKICK in any order (see FIG. 3), then one of the eight characters is removed from the suspect list. If the start-bonus outcome was the combination DETECTIVE, SIDEKICK, SIDEKICK in any order, then two of the eight characters are removed from the suspect list. Finally, if the start-bonus outcome was the combination SIDEKICK, SIDEKICK, SIDEKICK, then three of the eight characters are removed from the suspect list. If the start-bonus outcome consisted solely of the combination of three DETECTIVE symbols, however, then the sidekick character 66 does not emerge.

Next, game control is transferred to the player, who can then select a character that he or she believes is guilty. Alternatively, the bonus game screen may include a menu panel 67 with color icons of five, six, seven, or eight characters (depending on the number of SIDEKICK symbols in the start-bonus outcome), and the player may select the character's icon in the menu panel. Icons of any characters removed from the suspect list by the sidekick character 66 are preferably grayed out or not shown. This gives the player the flexibility of either choosing the character directly or using the character's icon to make the player's choice. The fewer selections it takes the player to find the guilty character, the greater the bonus.

Figure 8:
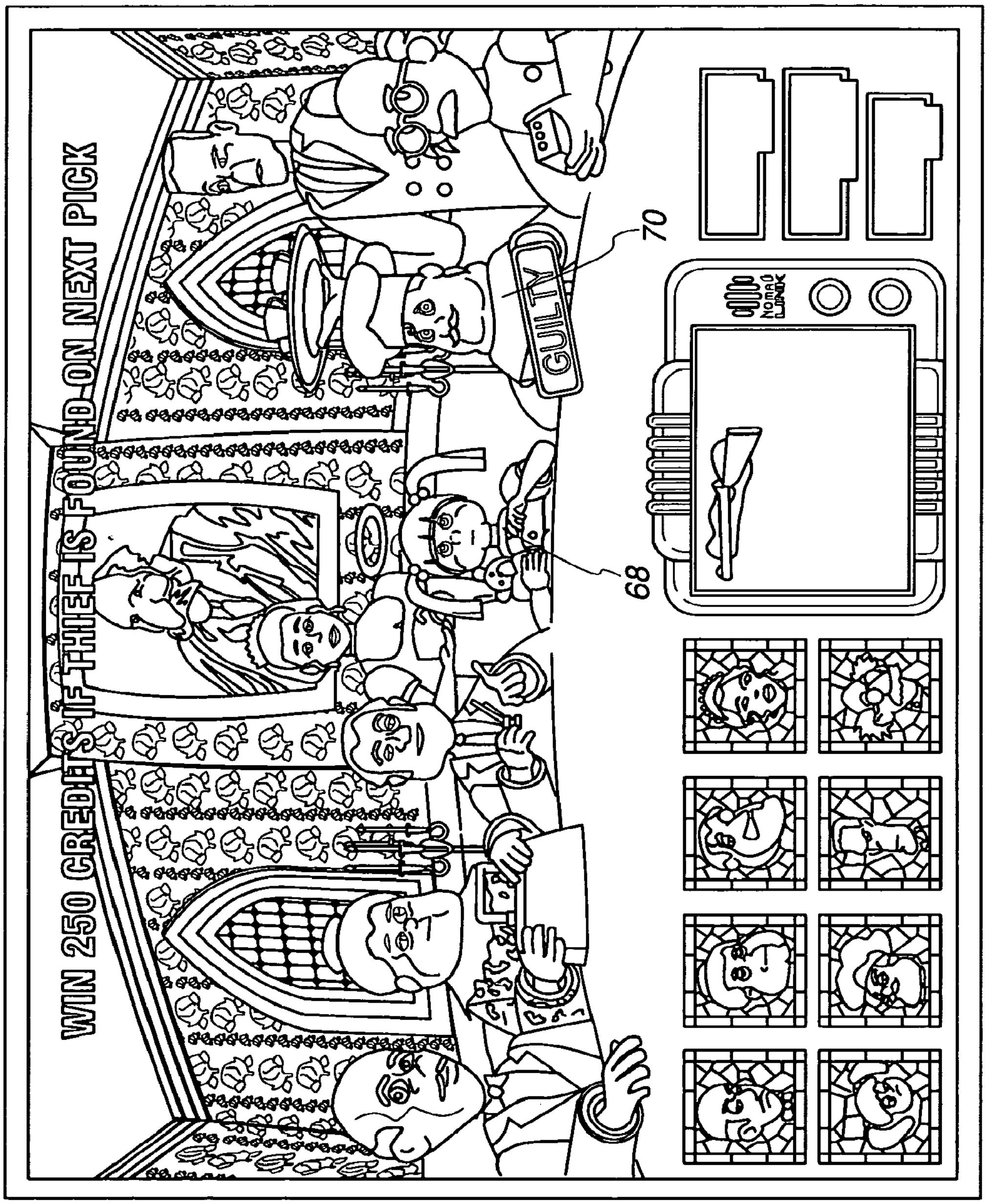

There are two possible outcomes once a character is chosen by the player—the character is either innocent or guilty. If the character is innocent, then the character undergoes an animated transition to innocence. Specifically, the character's icon from the menu panel is disabled, a new sprite is placed over the top of the character with a brighter lighting, and a halo is put above the character's head. The character may also speak one of three different phrases such as "I told you I didn't do it." The innocent character cannot be chosen again. In FIG. 8, the Little Girl 68 has undergone a transition to innocence.

If the selected character is guilty, then the guilty character speaks one of three guilty phrases, is stamped guilty, and is given an appropriate facial expression. In FIG. 8, the Italian Chef 70 has undergone a transition to guilty. At this point, the processor occasionally triggers one or more additional bonus features discussed below. If none of these bonus features is triggered, however, the processor ends the bonus game and awards a primary bonus to the player. The video display may accompany the award of the primary bonus with animations celebrating the capture of the guilty suspect.

The three additional bonus features that can be triggered prior to awarding the primary bonus immediately upon selecting the guilty character are an accomplice feature, an additional stolen item feature, and a go-to-suspect's-hideout feature. Although the CPU 16 (FIG. 2) is programmed such that it is highly unlikely for more than one of these bonus features to occur in the bonus game, it is possible for one, two, or all three of these features to occur in the bonus game.

In the accomplice feature, the guilty character has an accomplice who the player must find for a supplemental bonus. The player finds the accomplice by continuing to select the characters as described above until the accomplice is found. Finding the accomplice adds the supplemental bonus to the primary bonus that was already awarded for finding the guilty character.

In the additional stolen item feature, the guilty character has another stolen item on him or her, such as another character's wallet, that awards the player with a supplemental bonus in addition to the primary bonus already awarded for finding the guilty character.

In the go-to-suspect's-hideout feature, which occurs very rarely, the guilty character says "I did it but you've got to catch me first" and flees the scene of the crime to his or her hideout. The player is then taken to the bonus screen in FIG. 9, which shows the guilty character's hideout with highlights around key areas such as a closet, table, chest, window, stove, trapdoor in the floor, etc. These highlights represent possible hiding places for the guilty character. The object of this bonus feature is to find the hiding place of the guilty character in as few selections as possible. The fewer the number of selections it takes the player to find the hiding place of the guilty character, the greater a payout multiplier. Finding the hiding place of the guilty character applies the multiplier to the total payout (including any basic and bonus game payouts) that were already awarded to the player.

Referring now to FIG. 10, there is shown a pay table for the primary bonus awarded for finding the guilty character from the suspects shown on the display screen captures in FIGS. 5-8. The player is awarded a primary bonus based on the number of selections required to find the guilty character. The fewer the number of selections it takes the player to find the guilty character, the greater the primary bonus. If a player finds the guilty character with his or her first selection, the player is awarded a primary bonus of 250 credits multiplied by the number of active paylines; if the player finds the guilty character with his or her second selection, the player is awarded a primary bonus of 200 credits multiplied by the number of active paylines; if the player finds the guilty character with his or her third selection, the player is awarded a primary bonus of 150 credits multiplied by the number of active paylines; and so on.

As discussed above, the number of selectable suspects is reduced by one for each SIDEKICK symbol appearing in the start-bonus outcome that triggered the bonus game. Therefore, the number of available primary bonuses is reduced by one, starting from the lowest primary bonus appearing in the pay table, for each SIDEKICK symbol appearing in the start-bonus outcome. For example, if the start-bonus outcome includes one SIDEKICK symbol, the lowest primary bonus of 30 credits per active payline is unavailable to the player; if the start-bonus outcome includes two SIDEKICK symbols, the two lowest primary bonuses of 30 and 50 credits per active payline are unavailable to the player; and if the start-bonus outcome includes three SIDEKICK symbols, the three lowest primary bonuses of 30, 50, and 70 credits per active payline are unavailable to the player. In other words, each SIDEKICK symbol in the start-bonus outcome successively removes a primary bonus from the hierarchy of primary bonuses that can be won by the player, starting with the lowest primary bonus in the pay table.

Accordingly, the probability of winning each available primary bonus, including the highest primary bonus of 250 credits per active payline, successively increases for each SIDEKICK symbol in the start-bonus outcome. Specifically, if the start-bonus outcome includes no SIDEKICK symbols, the player has a 1 in 8 probability of winning each of the primary bonuses of 250, 200, 150, 100, 80, 70, 50, and 30 credits per active payline; if the start-bonus outcome includes one SIDEKICK symbol, the player has a 1 in 7 probability of winning each of the primary bonuses of 250, 200, 150, 100, 80, 70, and 50 credits per active payline (30 credits not available); if the start-bonus outcome includes two SIDEKICK symbols, the player has a 1 in 6 probability of winning each of the primary bonuses of 250, 200, 150, 100, 80, and 70 credits per active payline (30 and 50 credits not available); and, finally, if the start-bonus outcome includes three SIDEKICK symbols, the player has a 1 in 5 probability of winning each of the primary bonuses of 250, 200, 150, 100, and 80 credits per active payline (30, 50, and 70 credits not available).

Figure 9:
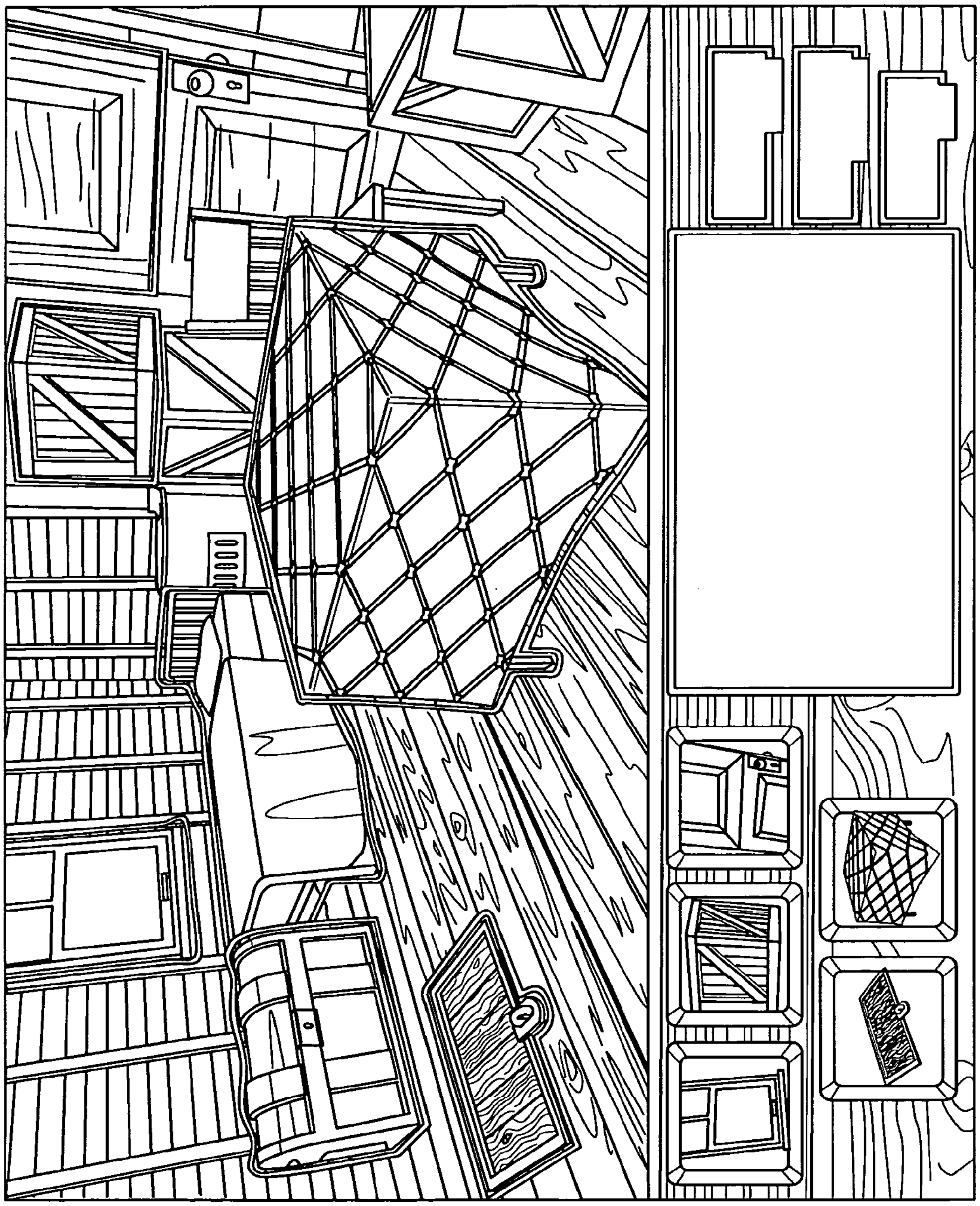

Referring now to FIG. 11, there is shown a multiplier table for the bonus payout multiplier for finding the hiding place of the guilty character in the hideout shown in the display screen capture in FIG. 9. The multiplier is based on the number of selections required to find the hiding place of the guilty character. The fewer the number of selections it takes the player to find the hiding place, the greater the bonus payout multiplier. If a player finds the hiding place with his or her first selection, the total bonus payout to that point in the game is multiplied by 8; if the player finds the hiding place with his or her second selection, the total bonus payout is multiplied by 5; if the player finds the hiding place with his or her third selection, the total bonus payout is multiplied by 4; and so on.

In the illustrated embodiment, the number of selectable hiding places is not affected by the number of SIDEKICK symbols appearing in the start-bonus outcome. Therefore, the player has a 1 in 5 probability of winning each of the multipliers of ×8, ×5, ×4, ×3, and ×2, regardless of the number of SIDEKICK symbols appearing in the start-bonus outcome.

In an alternative embodiment, the number of selectable hiding places is reduced by one for each SIDEKICK symbol appearing in the start-bonus outcome and, therefore, the number of available multipliers is reduced by one, starting from the lowest multiplier appearing in the multiplier table, for each SIDEKICK symbol appearing in the start-bonus outcome. Accordingly, the probability of winning each available multiplier, including the highest multiplier of ×8, successively increases for each SIDEKICK symbol in the start-bonus outcome.

Figure 12:
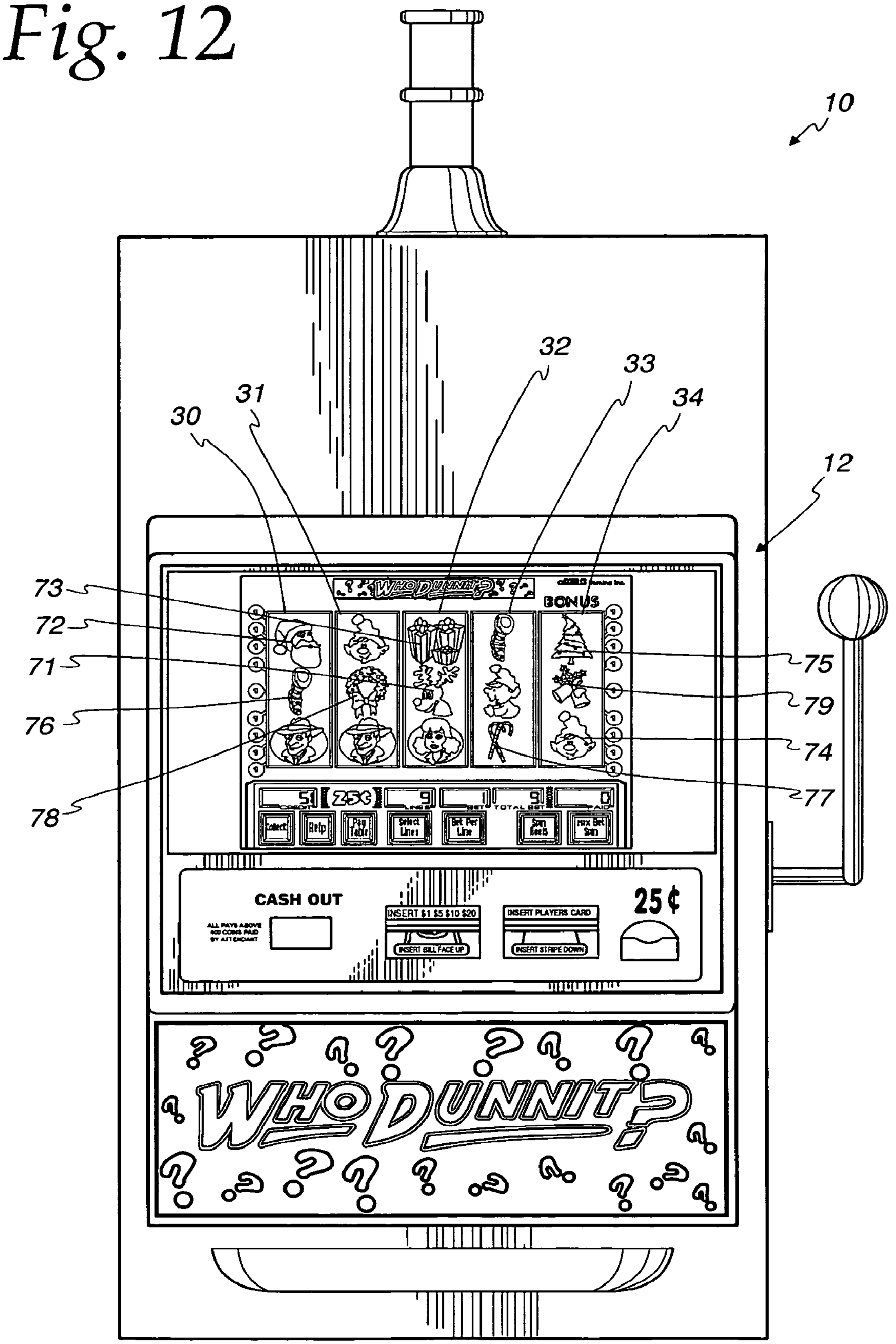
FIG. 12 illustrates a slot machine where the symbols on the video display have been modified to a Christmas holiday theme.

FIG. 12 illustrates the gaming machine 10 having a video display 12 where the five simulated reels 30-34 now include symbols 71-79 having a Christmas theme, such as a reindeer 71, Santa's face 72, presents 73, an elf 74, the Christmas tree 75, a stocking 76, a pair of candy canes 77, a Christmas wreath 78, and holly with bells 79. These symbols 71-79 of the Christmas motif replace the symbols shown in FIG. 3 when a predetermined time is encountered, usually a time just before Christmas.

The predetermined time is determined by the CPU 16 (FIG. 2). Typically, the CPU 16 has an internal clock that can be used to determine the real time of the gaming machine 10, or the CPU 16 may receive signals from an external clock. The CPU 16 then downloads data from the system memory 20 (FIG. 2) that corresponds to the Christmas symbols 71-79 that will be displayed on the video display 12 when the predetermined time is encountered. Accordingly, the Christmas motif is displayed on the reels 30-34 at a known and predetermined time.

Figure 13:
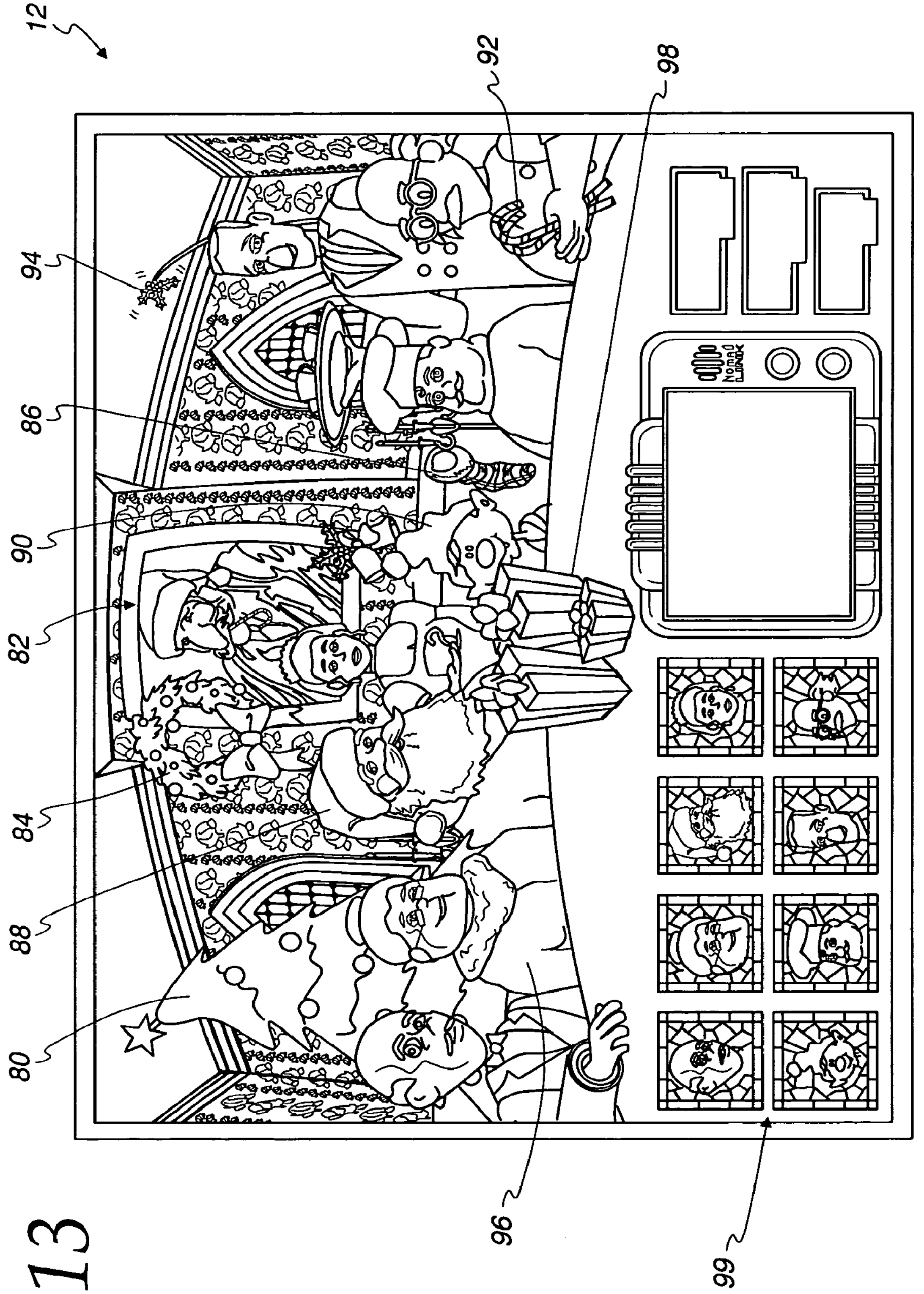
FIG. 13 illustrates the display where a bonus game has been enacted, as shown in FIG. 5, but the features of the display are of a Christmas holiday theme.

FIG. 13 illustrates the display 12 in which the player of the gaming machine 10 has engaged in a bonus game similar to FIG. 5. Unlike the bonus game display of FIG. 5, however, the bonus game of FIG. 13 is of a Christmas holiday theme or motif. For example, a Christmas tree 80 has now been placed in the back of the room. The picture of the distinguished gentleman in the center of the room has been replaced by a Christmas theme gentleman 82 wearing a Santa hat and chewing a candy cane. Further, there is a Christmas wreath 84 in the middle of the room and a stocking 86 hanging on the wall. All of these items are, of course, background features to the substantive display elements that the player selects (via a touch screen or keyboard) to determine whether he or she will be receiving a bonus game payout. In other words, these Christmas motif visual elements 80, 82, 84, 86 are independent of whether a player will receive a bonus payout. Other types of non-selectable visual elements are displayed while no player is playing the gaming machine. This may include the characters from the bonus game.

In addition, the visual element features of the bonus game that are selected by the player with the hope of receiving a bonus payout have also changed. For example (and referring also to FIG. 5), the Shady Lawyer has now been replaced by Santa Claus 88. The Little Girl has been replaced by an Elf 90. The Professor is now holding a handful of candy canes 92, and the Butler now has a holly leaf 94 hanging from his head. Further, the Old Maid is now dressed in holiday garb 96 and appears quite joyous. In addition, the items of value that were formerly in the center of the table have now been replaced by Christmas presents 98. If the bonus game includes a menu panel that is selectable by the player, then it may be a Christmas theme menu panel 99. Thus, the gaming machine 10 may change visual elements that are associated with or unassociated with the outcome of the game.

The data that is needed to modify these visual elements is stored in system memory 20 (FIG. 2), just as the data for FIG. 5 is also stored in system memory 20 (FIG. 2). When the real time of the gaming machine 10 reaches a predetermined time, such as December 10, the CPU 16 (FIG. 2) then stops downloading data corresponding to the visual elements of FIG. 5 and begins to download data from the system memory 20 (FIG. 2) corresponding to the visual elements of FIG. 13. The data may be for "still" video images or may be animated so that one or more of the images moves. It should also be noted that the data for specific events can be externally downloaded from a casino gaming machine system controller, or possibly the internet, instead of being downloaded from the internal memory 20 of the gaming machine.

Figure 14:
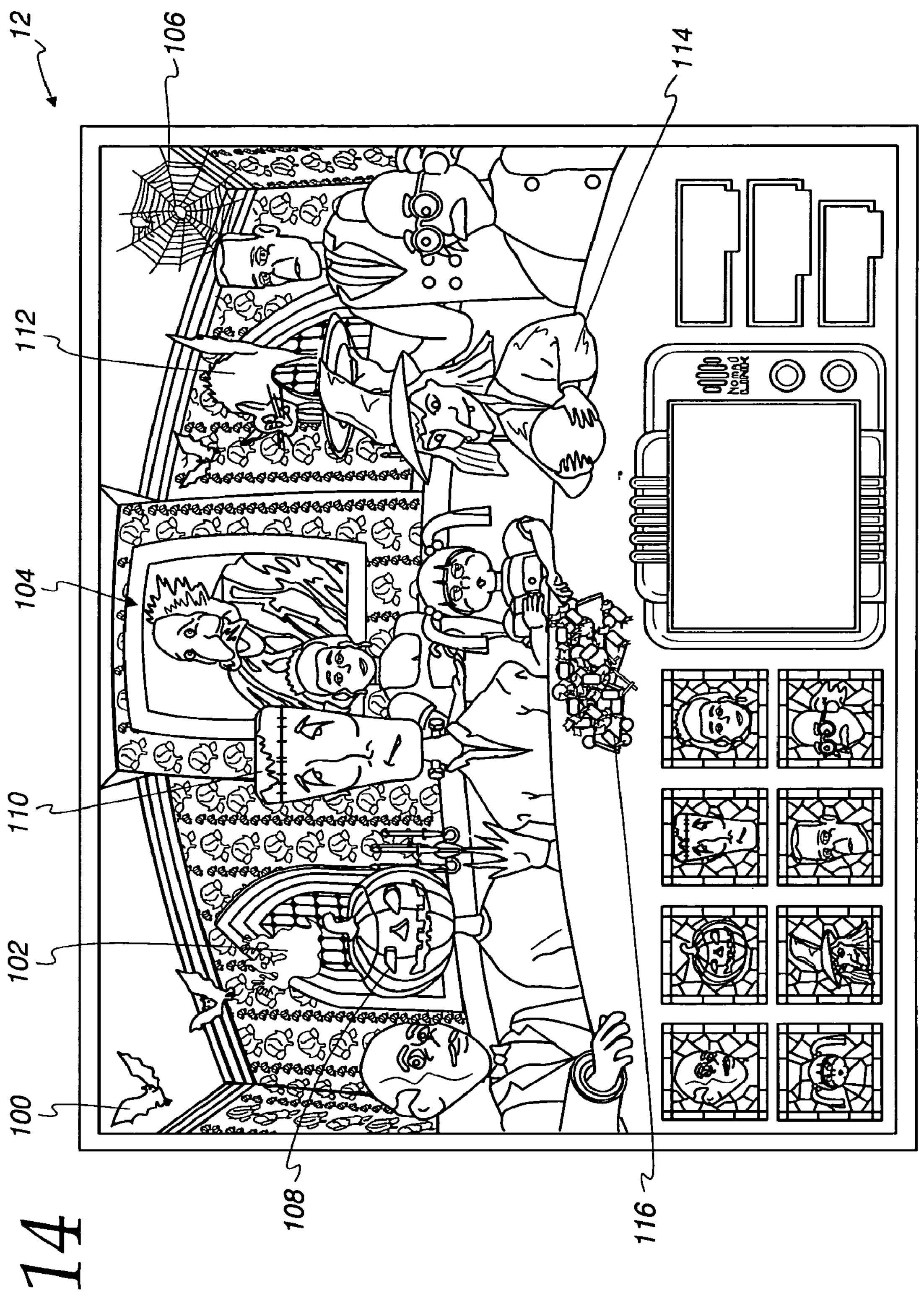
FIG. 14 illustrates the display where a bonus game has been enacted, as shown in FIG. 5, but the features of the display are of a Halloween holiday theme.

In FIG. 14, the video display 12 illustrates the cast of characters in FIG. 5 in a Halloween motif. Here, there are bats 100 and a ghost 102 in the background. The distinguished gentleman in the picture has now been replaced by a frightened gentleman 104 and a spider web 106 is at the top right corner of the picture. Additionally, the Old Maid has been changed to a Pumpkin Head 108. The Shady Lawyer has been replaced by Frankenstein 110, the Butler is now serving a cat 112 on his plate, and the Italian Chef has been replaced by a Witch 114 gazing into a crystal ball. Additionally, the items of value at the center of the table in FIG. 5 have been replaced by trick-or-treat candy 116.

Like the data for the visual elements and animation for the Christmas theme of FIG. 14, the data that is needed to develop the Halloween visual elements and animation are stored in system memory 20. When the real time reaches a predetermined time, such as October 20 (or simply the day October 31), then the CPU 16 (FIG. 2) begins to download the data that will produce the Halloween visual elements of FIG. 14 instead of the data that produces FIG. 5.

While the illustrated embodiments of the present invention have included Christmas and Halloween motifs, different motifs for other commonly known societal events and holidays can also be stored in the memory. For example, the holidays of Valentine's Day, St. Patrick's Day, Mardi Gras, Easter, the $4^{th}$ of July, Thanksgiving, New Year's Eve, and New Year's Day can also have associated visual elements, the data sets for which are stored in the system memory 20 (FIG. 2). When the CPU 16 (FIG. 2) determines from the internal or external clock that the real time is one of these holidays or a range of days before and after one of these holidays, the CPU 16 (FIG. 2) then downloads the associated data set from the system memory 20 (FIG. 2). Consequently, because the visual effects and aesthetics of the game are constantly changing, the player appeal of the gaming machine time is increased.

Figure 15:
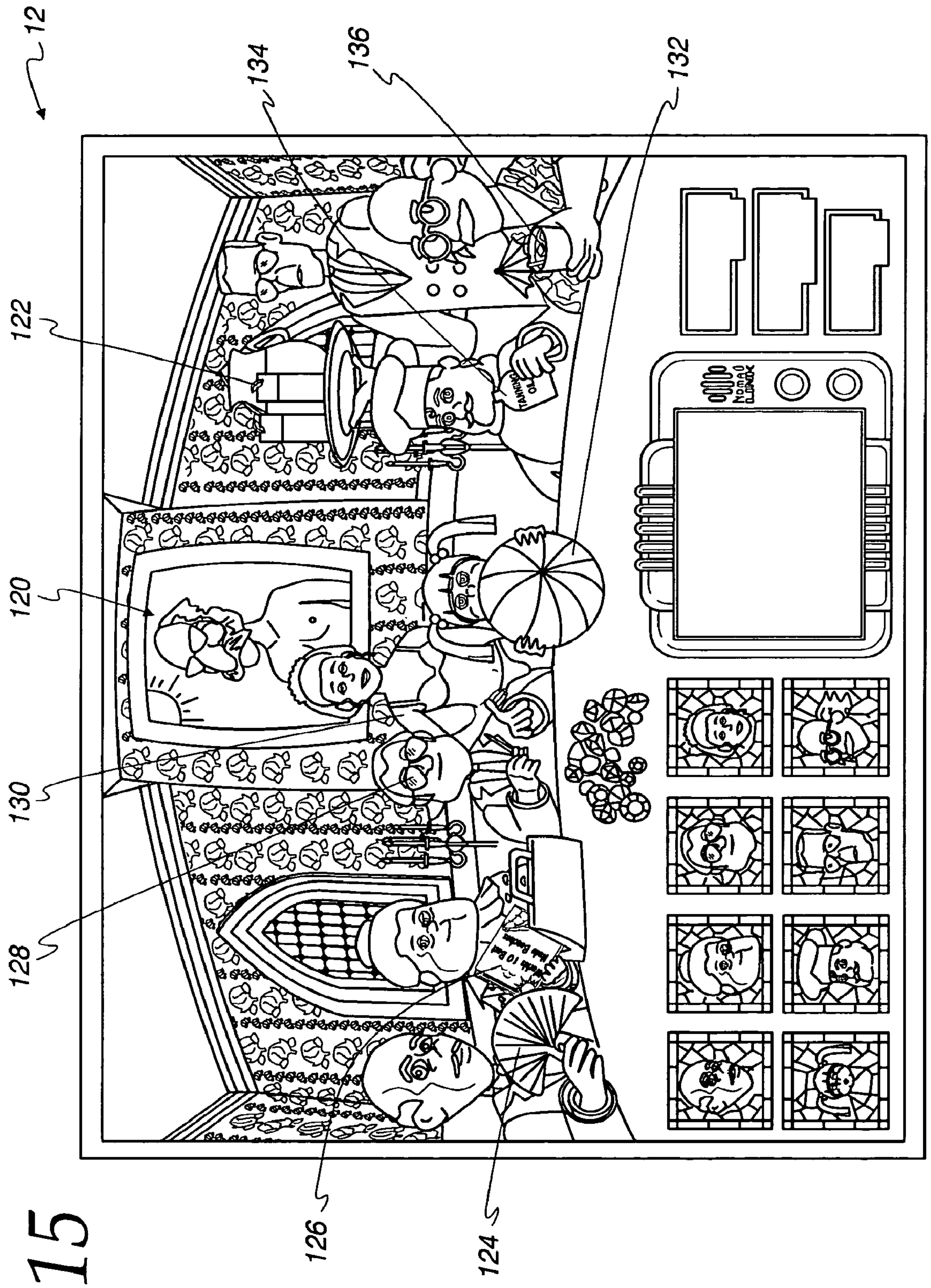
FIG. 15 illustrates the display where a bonus game has been enacted, as shown in FIG. 5, but the features of the display are of a summer seasonal theme.

The gaming machine 10 can also change its visual elements based on seasonal conditions, as opposed to holidays or other societal events. For example, in FIG. 15, the theme has now shifted to a summer theme. The distinguished gentleman in the picture in FIG. 5 is now a bare-chested, older man 120 donning sunglasses. The Butler is also wearing sunglasses and is now bringing a tray full of iced tea to the remainder of the characters. The Accountant is holding a fan 124, the Old Maid is holding a beach book 126, and the Shady Lawyer 64 is wearing a pair of shades. Further, the French Maid is now wearing a bikini 130, the Little Girl is holding a beach ball 132, the Italian Chef is holding tanning oil 134, and the Professor is drinking a fruity cocktail 136 and wearing a Hawaiian shirt. The seasonal summer theme of FIG. 15 can been downloaded by the CPU 16 (FIG. 2) from the system memory 20 (FIG. 2) during certain times of the summer or all summer. Further, this summer motif may be displayed during selected days during the summer, such as Memorial Day weekend or Labor Day weekend. Similarly, a spring, fall, or winter theme can be established, as well. Considering all the various holiday and seasonal themes, it is possible to have the visual motif change from theme to theme without playing the same theme twice in one year.

Figure 16:
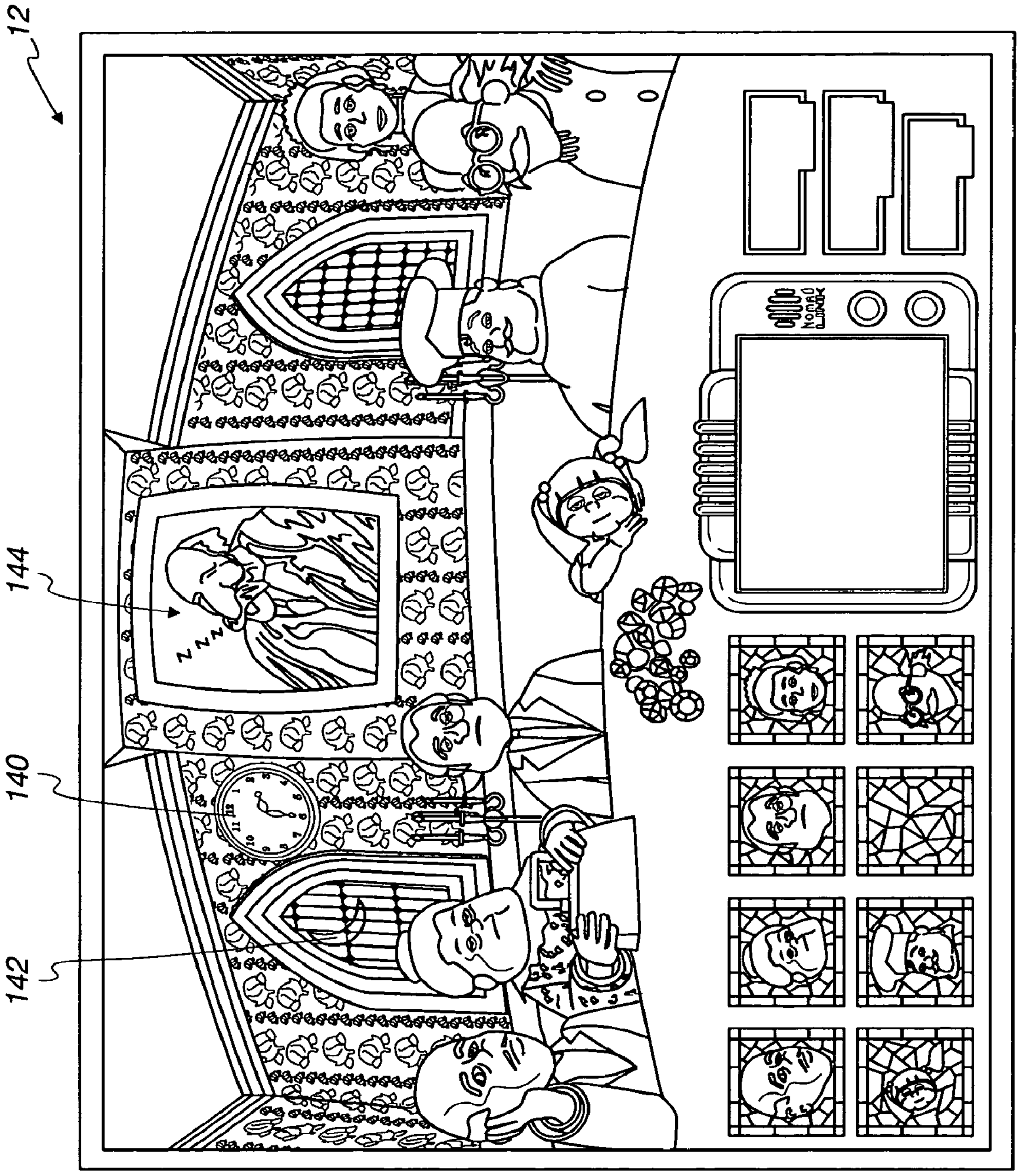
FIG. 16 illustrates the display where a bonus game has been enacted, as shown in FIG. 5, but the features of the display are of a nighttime theme.

FIG. 16 illustrates a different type of motif that occurs when the predetermined time is at a certain time of the day. For example, when the time is late at night, the expressions of the characters can shift to ones which show exhaustion or listlessness. Additionally, the background elements can change such that a clock 140 on the wall illustrates the real time, for example, 2:30 AM. Further, some of the characters may change their activities, such as the Little Girl putting her head down on the table and the French Maid now giving the Professor a rubdown on his shoulders. A moon 142 can appear in one window and move across that window as time progresses (or even move to the window on the other side of the room at a certain time, as well). Very late in the evening (e.g., 5:00 AM), the sun can begin to rise through the windows and birds can begin to chirp. Additionally, the distinguished gentleman 144 in the picture at the side of the room can suddenly close his eyes and begin to snore, as exhibited by the zzz's exiting his mouth.

FIGS. 12-16 have been described as having an alteration of the visual elements of the gaming machine 10 to provide player appeal. Alternatively, the gaming machine 10 can have only audio elements which occur at the predetermined time. For example, during the Christmas season, one or more of the characters in FIG. 5 may state something like: "[w]hy would I steal any of these precious items when this is Christmas, the season of giving?" or "I'm having a little problem funding Christmas this year." Alternatively, during Halloween, the Little Girl may say "I'm feeling a little scared tonight. It seems spooky in here." Similar audio elements can be stored in the memory device 20 (FIG. 2) for each of the common societal holidays or events throughout the year and broadcasted through audio speakers while the standard visual motif of FIG. 5 remains unchanged. The audio elements may be indicative of seasons or the time of a certain day (i.e., a bell sounding at the top of each hour or birds chirping in the morning). The audio elements may be associated with an outcome.

In a further embodiment, the visual elements can be displayed and the audio elements broadcasted in unison at a predetermined time. In other words, the player is visualizing various types of holiday themes at certain times of the year while also listening to certain audio elements associated with that holiday, as well. These audio elements may be as simple as music associated with that societal event or holiday or the phrases and statements from various characters within the game, similar to those mentioned in the previous paragraph.

In yet a further alternative embodiment, the gaming machine can display or broadcast trivia on a certain day of the year or provide audio trivia elements on a certain day of the year. For example, on September 27 of any year, the gaming machine 10 may display or broadcast certain pieces of trivia, such as "[o]n Sep. 27, 1998, Mark McGwire of the St. Louis Cardinals hit home run numbers 69 and 70 to set the major league baseball home run record." Or on October 18 of any year, the gaming machine 10 may display or broadcast "[o]n Oct. 18, 1924, Harold 'Red' Grange, also known as the 'Galloping Ghost,' scored five touchdowns and passed for another for the University of Illinois as Illinois defeated previously undefeated Michigan 39-14, in what many believe to be the greatest offensive display in college gridiron history."

Several pieces of trivia may be provided for each given day of the year and may be displayed via visual elements or broadcast via audio elements between games within the gaming machine 10 or after a player has achieved a certain positive outcome. For example, after a positive outcome is achieved on September 27 of any year, the gaming machine 10 may query the player "[a]re you as happy today as Mark McGwire was on Sep. 27, 1998, when he hit home run numbers 69 and 70 to set the major league baseball home run record?" This is an example of an audio element or visual element that is associated with a particular outcome. In yet a further alternative, the trivia facts displayed on the machine for a certain date may progressively tell a story, for example, the hourly occurrences during the invasion of Normandy from World War II. As such, if the player remains on the gaming machine 10, the player may receive five or ten different chronologically timed facts about the invasion of Normandy and how it progressed on that date in 1944.

In another alternative, the gaming machine payout structure can be modified as a function of the predetermined time. The changing of the payout structure can occur by itself or in combination with changing the visual or audio elements of the gaming machine 10. The payout structure has a certain payback percentage that is a function of the amounts of possible paybacks and the likelihood of the occurrence for each of the paybacks. Put simply, the payback percentage is defined as the average percent of each wager that is returned to players. Thus, a first payout structure may have a lower payback amount that occurs more frequently. A second payout structure would have a higher payback amount that occurs less frequently. Yet, the first and second payout structures would have the same payback percentage. In response to the occurrence of a predetermined time, the payout structure can change from a standard payout structure to a modified payout structure. For example, between midnight and 1:00 AM, the payout structure may be set such that the payouts are more frequent, i.e., paybacks are not as high, but they occur more frequently. As another example, on St. Patrick's Day, the visual and audio elements may include Leprechauns speaking and the payout structure may be altered to provide lower payouts, but more frequently.

Figure 17:
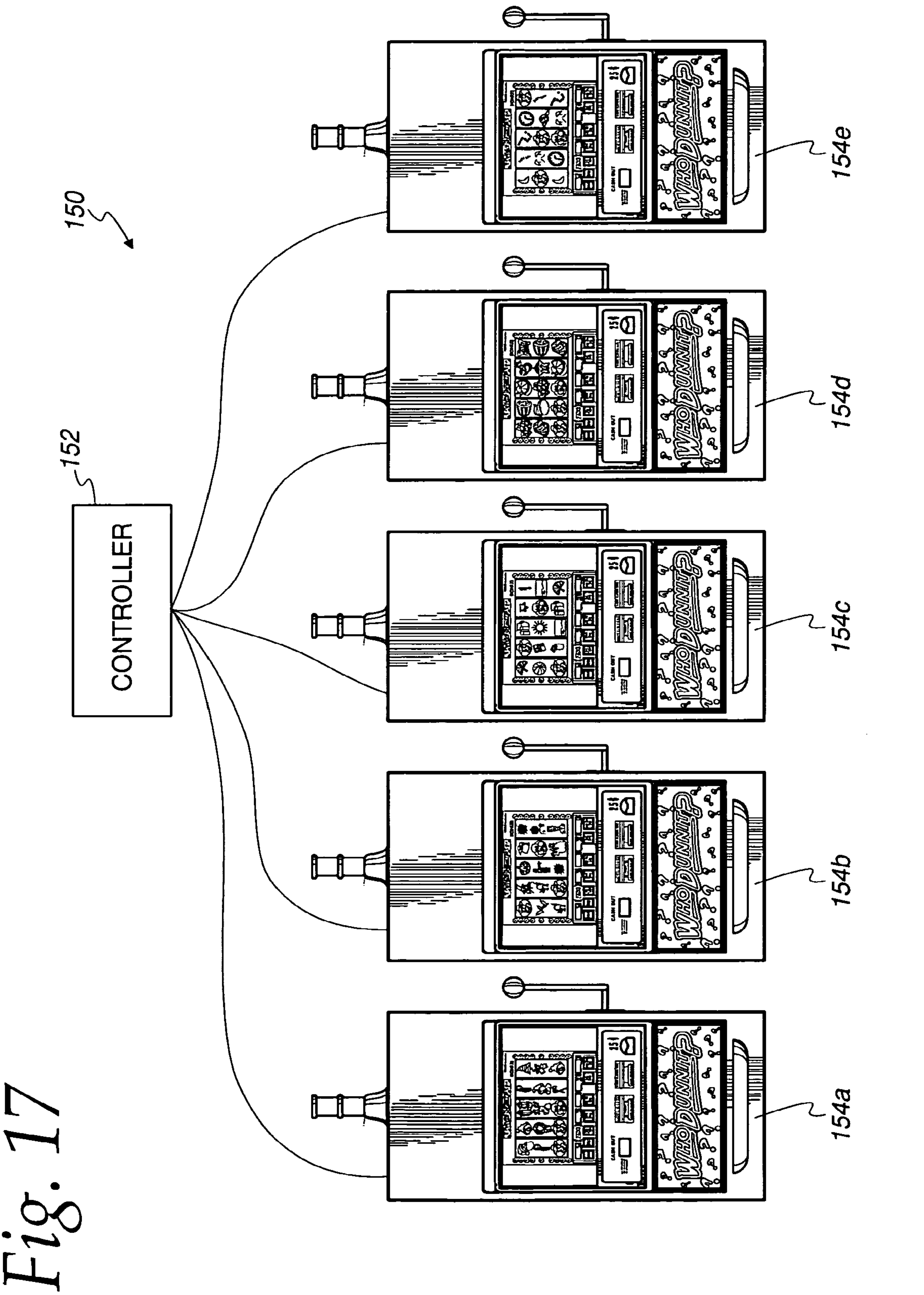
FIG. 17 illustrates a bank of gaming machines that are all connected to a controller, whereby each gaming machine can have a different theme and the most popular of the themes, as measured by the amount of wager input, can be determined by the controller.

Referring now to FIG. 17, a gaming machine system architecture 150 is illustrated that includes a controller 152 that is linked to a plurality of gaming machines 154*a*-154*e*. The system architecture 150 is useful for determining which type of visual elements, audio elements, or other types of player appeal features are the favorite among players. In the system architecture 150, the wager inputs for each of the plurality of gaming machines 154*a*-154*e* are monitored by the controller 152. The controller 152 may intermittently download information on the wager inputs at selected times or continuously download information for real time updates. A correlation exists between the favorite visual elements, audio elements, or other player appeal features and the total amount of wager inputs for the associated machine on which they are displayed and/or broadcasted. When the controller 152 determines that a particular player appeal feature is the favorite of players, it then takes the necessary steps to inform a particular one of the gaming machines 154*a*-154*e*, which is not displaying or broadcasting the favorite visual and/or audio elements, to begin playing the favorite visual and/or audio element. In other words, the amount of wager input to each machine is a feedback mechanism by which the controller 152 determines which of the visual elements, audio elements, and/or other player appeal features is the favorite, thereby causing that favorite to be displayed and/or broadcasted more frequently on other machines 154*a*-154*e*. For example, the favorite visual element or audio element may be displayed for more than 75% of any day or 75% of any week.

In addition to the feedback mechanism described above with reference to FIG. 17, the internal controller (e.g., CPU 16 in FIG. 2) of one particular gaming machine 10 monitors the wager inputs for that machine while different visual elements are being displayed, audio elements are being broadcasted, and other player appeal features are being displayed/broadcasted so that the controller internally determines which of the features are the most appealing to the players. Once the favorite of the players is determined, the internal controller for the gaming machine 10 begins to play that player appeal feature more frequently. Because the amount of wager inputs is also a function of the number of people in the casino, which is a function of the day and the time of the day, the controller of the internal machine or the controller 152 of the system architecture 150 of FIG. 17 may monitor wager inputs over a longer period of time, such as a week, in order to determine which of the player appeal features is the favorite.

Further, the gaming machine 10 or the system architecture 150 of FIG. 17 may determine the types of video elements and audio elements that are the favorite at certain times of the day or on certain days of the week. This is due to the demographics of individuals entering the casino on certain days and at certain hours of the evening. Accordingly, knowing that a demographic group is most prevalent on Friday nights and Saturday nights, the gaming machine 10 and the system architecture 150 of FIG. 17 may act to determine the favorites on Friday nights and Saturday nights and display those favorites more on those nights than on other nights. Alternatively, a second demographic group may be more prevalent during the weekdays from 8:00 AM until 4:00 PM. Thus, the gaming machine 10 and the system architecture 150 of FIG. 17 may act to determine the favorites for this second demographic group and display those favorites at those hours.

Figure 18A:
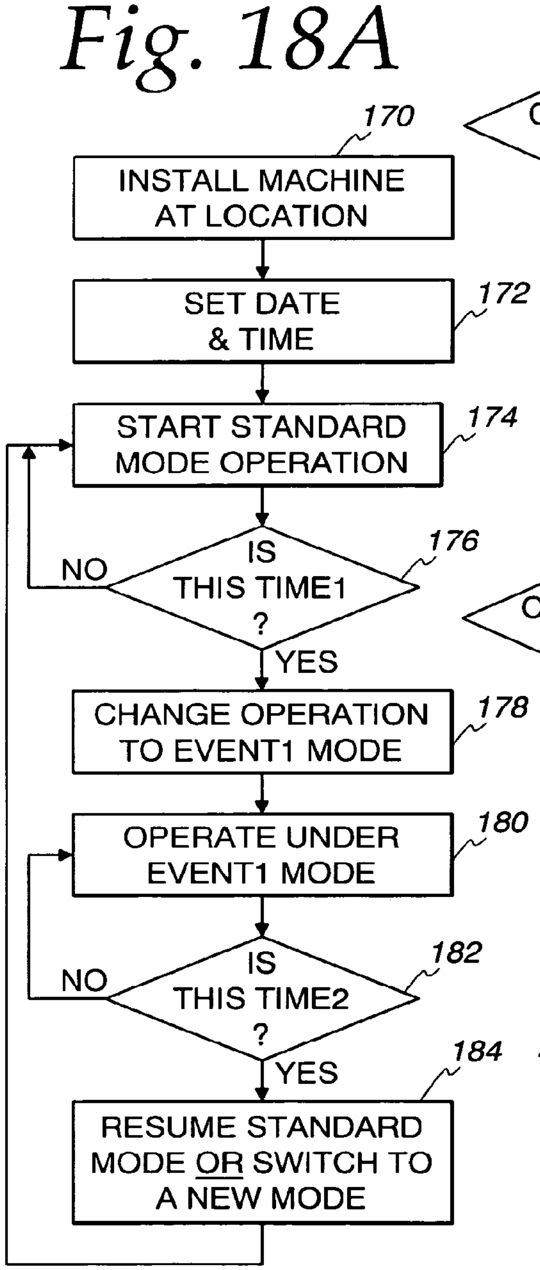
FIGS. 18A and 18B illustrate flow charts of the algorithms used to change the visual and audio elements.

Referring now to FIG. 18A, the algorithm for establishing the use of the gaming machine 10 having a modified array of visual and/or audio elements is disclosed. First, at step 170, the machine is installed at a certain location, likely within a casino. Next, at step 172, the data for the time and date on the machine is established so that it is concurrent with real time. This is typically accomplished through the setting of the internal clock of the CPU 16 (FIG. 2) or an external clock that the CPU 16 (FIG. 2) monitors.

At step 174, the gaming machine 10 begins standard operation, whereby the standard visual elements for the gaming machine 10 are displayed (e.g., those associated with the operation pursuant to FIGS. 1-11). In the next step, step 176, the CPU 16 (FIG. 2) checks to see if the time is "time1." If the time is not "time1," the machine continues to operate in a standard mode of operation by returning to step 174. If the real time monitored by the CPU 16 (FIG. 2) is "time1," then the gaming machine begins a change of operation illustrated by step 178. In a preferred embodiment, the gaming machine 10 waits until the current game being played by a player at "time1" is finished before altering the visual and audio elements. At step 180, the gaming machine 10 begins to display the modified set of visual elements or broadcast the modified set of audio elements associated with "time1," which in real time is a certain time of day, season of the year, or commonly known societal holiday or event, "event1." That mode of operation continues until the real time is "time2," as shown in step 182.

When the real time is "time2," as determined at step 182, then the machine resumes the standard mode or can, alternatively, switch to a new mode of operation as shown in step 184. As such, the gaming machine 10 is then displaying these visual and/or audio elements associated with "event1" only between the real times corresponding to "time1" and "time2."

It should be noted that in step 184, when one switches to "a new mode of operation," video and/or audio elements are displayed and broadcast that are different than the initial mode of operation at step 174. That new mode of operation may continue until "time1" of the next day, week, month, or year is again achieved. Of course, the algorithm can be modified to have steps 176 and 182 have several dates ("time3," "times," "time7," etc., for step 176, and "time4," "time6," "time8," etc., for step 182) so that numerous changes can be made as a function of real time that provide a vast array of different audio and/or visual elements, thereby increasing player appeal.

Figure 18B:
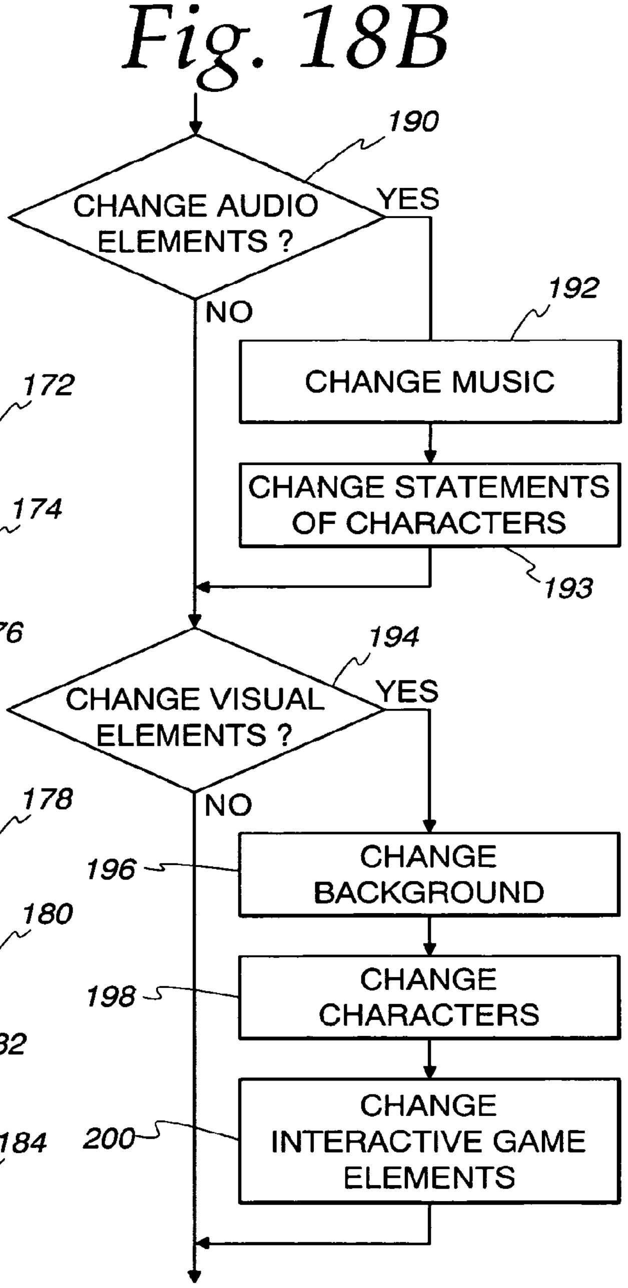

FIG. 18B provides one example of the general analysis that may occur under step 178. In step 190, the gaming machine 10 determines whether the new mode of operation associated with "event1" requires a change of the audio or audio elements. If it does, then the machine may change the music 192 and the character statements 193 (e.g., statements from the Shady Lawyer, Santa Claus, Old Maid, Professor, etc.). If the answer to step 190 is that the "event1" mode of operation does not require the changing of the audio or audio elements, then the machine proceeds to step 194, whereby the visual elements may be changed. If the visual elements require changing, then the background may change at step 196, the characters may change at step 198, and the interactive game elements may change at step 200. An example of the interactive game elements that are changed at step 200 is the simulated reels illustrated in FIGS. 1, 3 and 11, or the menu panels 67 (FIGS. 7) and 99 (FIG. 13). Of course, the characters may also be considered interactive game elements.

Alternatively, the mode of operation of "event1" may only change the audio elements in steps 192 and 193, but not require changes to the visual elements at step 194. In the case of a negative response at step 194, the visual elements do not change.

The algorithm of FIG. 18B is general. Certain events may require specific changes not illustrated in FIG. 18B. That is, the types of changes made to the video and audio elements are a function of the event associated with the real time. Thus, the data associated with various times such as "time1," "time3," "time5," etc., include instructions as to whether the audio elements are changed, whether the video elements are changed, and instructions on exactly how the audio and video elements are to be changed.

In a further embodiment, the gaming machine 10 acts to change the frequency at which a player encounters the bonus game while playing the basic game. The basic game includes a plurality of possible randomly-selected basic outcomes. In addition to the basic game generating a basic game payout in response to winning ones of the plurality of basic outcomes, at least one of the plurality of possible basic outcomes is a start-bonus outcome that triggers a bonus game feature that may generate a further payout bonus for the player. The start-bonus outcome has an average hit frequency, which is defined as how often the start-bonus outcome occurs on average relative to the plurality of possible basic outcomes. In this embodiment, the average hit frequency of the start-bonus outcome is automatically adjusted by the CPU 16 based on programmed criteria.

As in the previous embodiments, the gaming machine 10 may change the average hit frequency as a function of time. For example, the average hit frequency of the start-bonus outcome may be automatically increased by the CPU 16 at a predetermined time. The predetermined time is a certain time of day, time of month, time of year, or even a particular year. Programmed criteria other than time-based criteria are available, as well.

The gaming machine 10 has a payback percentage defined as the average percent of each wager that is returned to players in basic and bonus game payouts. The payback percentage of the gaming machine 10 is kept substantially the same by the CPU 16 even though the average hit frequency of the start-bonus outcome is automatically adjusted. Thus, the average value of the bonus generated by the bonus feature is adjusted by the CPU 16 to compensate for the adjustments to the average hit frequency of the start-bonus outcome. In particular, the average value of the bonus is s decreased by the CPU 16 as the average hit frequency of the start-bonus outcome is increased by the CPU 16 and vice-versa.

In a manner similar to the previous embodiment whereby a visual or audio motif is altered based on the number of player inputs when determining the favorite motif of the players, a further embodiment alters the visual motif after the gaming machine monitors a certain number of wager inputs from players of the gaming machine. For example, after a certain number of plays of the gaming machine, the visual or audio motif is altered such that the feel of the gaming machine is different. This is contrasted to one of the previous embodiments where the visual or audio motif changes as a function of real time (e.g., motif changes as a function of the time of the day, the year, or the season of the year).

As an example, a slot machine has in its memory a plurality of data sets that are used to produce a plurality of different types of visual motifs on the display of the slot machine. The slot machine displays a first one of the plurality of visual motifs for 25 spins of the reels of the slot machines (i.e., 25 plays by the player or players). After the 25th spin, the slot machine begins to display a second one of the plurality of visual motifs.

In one preferred embodiment, the plurality of data sets correspond to a plurality of visual motifs that include a series of cyclical motifs that can be consecutively displayed. For example, the series of cyclical motifs may be the seasons of the year. For a certain number of spins, the background visual elements of the display of the slot machine would provide a Spring motif. After that certain number of spins has occurred, the background visual elements of the display of the slot machine would be altered to a Summer motif. This would then be followed by the Autumn and Winter motifs, which would then lead into the Spring motif once again. In addition to simply the background visual elements changing, the visual elements that dictate the outcome of the slot machine (e.g., the symbols on the reels) could also change.

Another type of cyclical motif involves the switching between a day motif and a night motif. The background visual elements may have clouds and the sun for the day motif, but switch to stars and the moon for the night motif. The cyclical change in motif may also cause changes in the player-selectable visual elements. For example, the player may select one or more cloud formations with the hope of receiving a beneficial outcome during the display of the day motif, and one or more star constellation formations with the hope of receiving a beneficial outcome during the display of the night motif.

In addition, the gaming machine has visual motifs that change based on the outcome of a bonus game. In other words, while a certain visual motif is displayed during a basic game and may continue as the player enters a bonus game, the outcome of the bonus game dictates the visual motif in the basic game after the bonus game is complete. Thus, a player who has been quite successful in the bonus game will see a basic game with a different motif, as opposed to one who has not been successful. Alternatively, the visual motif can simply change after each bonus game has been completed, regardless of the outcome of the bonus game.

In addition to commonly known societal events that occur on certain days, the present invention contemplates the fact that some societal events will become commonly known due to the public broadcasting, such as by radio or television. In other words, commonly known societal events include things such as the Super Bowl, which is broadcast on radio and television in late January or early February. Thus, the aesthetics of the gaming machine may change at this time of year to a football theme. For example, the memory 20 (FIG. 2) for the gaming machine 10 may include the symbols for all NFL football teams and, based on an input signal indicating which two teams have reached the Super Bowl, the CPU 16 may select a theme or motif of the basic game and/or bonus game to include the colors of those two Super Bowl teams and their team symbols. The input signal may be downloaded, for example, from a host connected to a plurality of gaming machines 10. By way of example, the Professor in FIG. 5 can be wearing a football jersey, the Butler can be wearing a football helmet, the French Maid can be dressed in a cheerleader's outfit, and team pennants can be located on the walls of the room.

Additionally, certain TV shows that have become commonly known may be the basis for a motif that is selected by the CPU 16 at a certain time. By way of example, the TV show "Dallas" was very popular in the 1980's, especially the episode surrounding who shot J. R., one of this show's lead characters. Thus, a bonus game format could have characters from this TV show so as to enhance the attractiveness of the game to the player. During that time period of the broadcasting of this popular "Who Shot J. R.?" episode, a gaming machine according to the present invention would have altered the basic game and/or bonus game aesthetics so as to illustrate a theme related to this TV episode of Dallas. As a current example, the reality-based TV show "Survivor" has individuals competing in outdoor games over a several week period of the show, with the culmination being a final episode to determine who is the one and true survivor. The present invention contemplates the gaming machine altering some of its visual and/or audible elements so as to reflect some of the themes of the TV show "Survivor" during the general time period when the final episode (or the last few episodes) is to be broadcast because the popularity of this show has caused it to be a commonly known societal event. Further, the gaming machine may selected a bonus game format that is similar in theme to these outdoor games of competition in these episode (s).

Figure 19:
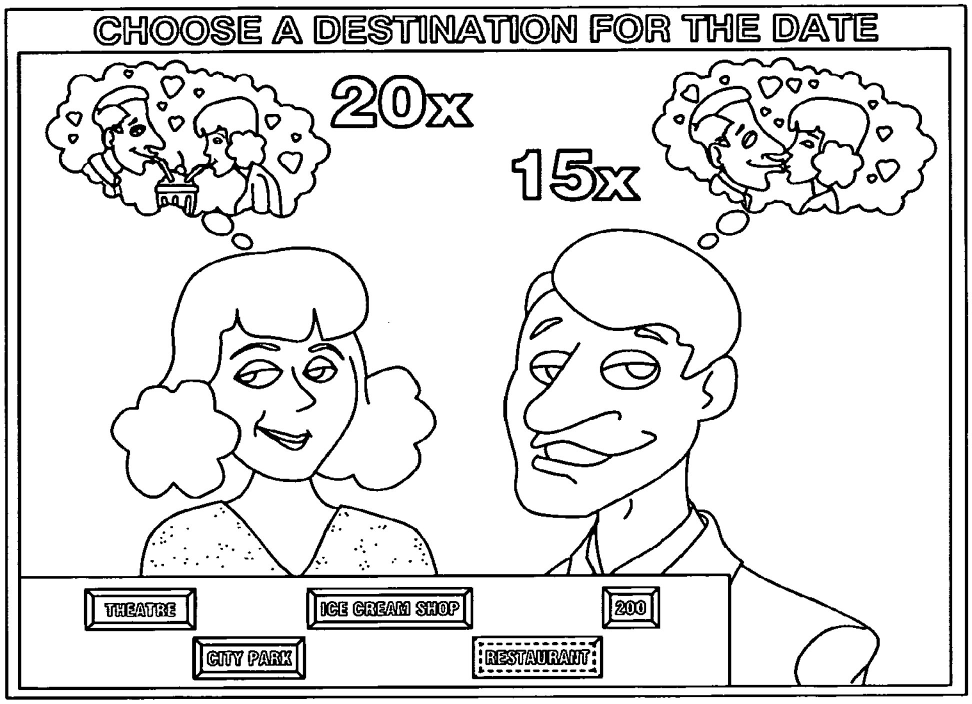
FIGS. 19-21 illustrate an alternative bonus game format that can be used in conjunction with another bonus game format, such as the one disclosed in FIGS. 5-9
Figure 20:
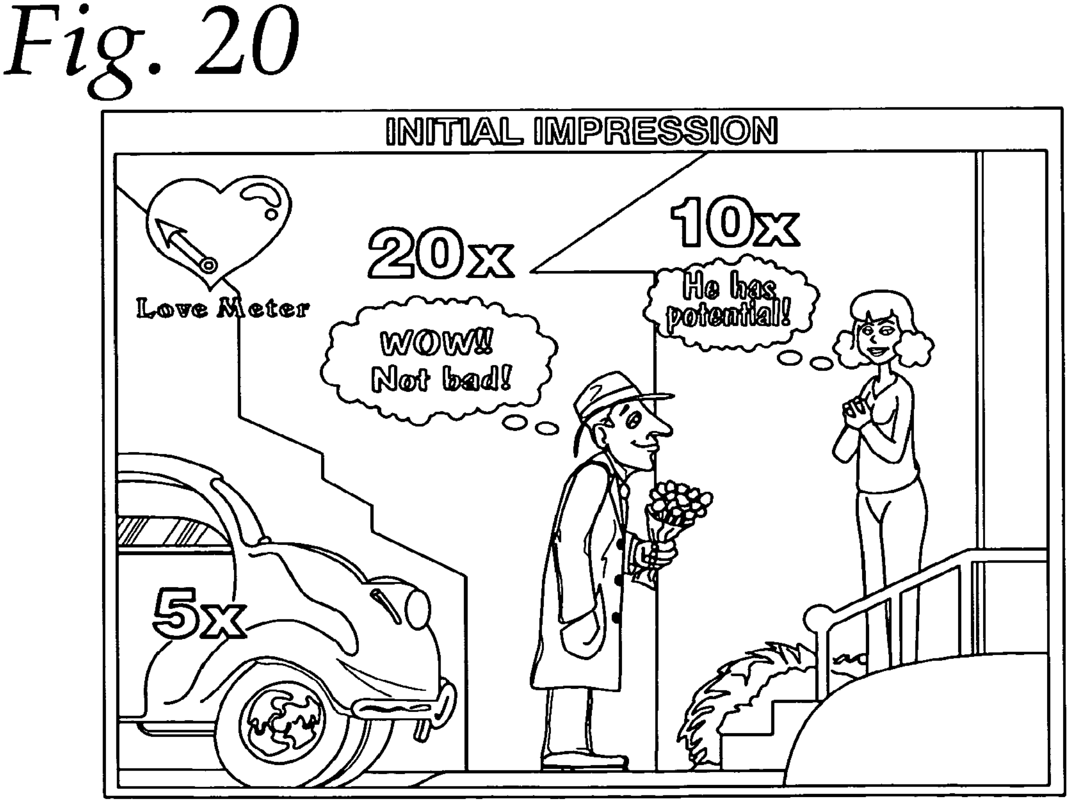
Figure 21:

Thus far, altering the play content for the bonus game has been primarily described relative to the aesthetics of the bonus game. For example, FIGS. 13-16 illustrate the aesthetics of the bonus game changing so as to reflect a variation in the theme or motif (e.g., Christmas, Halloween, summer, night, etc). These types of themes can be altered as a function of time, as a function of the number of wager inputs, or after a determination by the controller of the gaming machine as to which theme is a favorite based on the number of wager inputs. FIGS. 19-21 illustrate an alternative embodiment where the play content for the bonus game is altered such that the bonus game format is different, yielding a different type of bonus game. In this embodiment, the CPU 16 (FIG. 2) for the gaming machine 10 accesses the memory 20 that includes a first data set that presents the player with a first bonus game format (e.g., the bonus game format of FIGS. 13-16) and also a second data set that presents the player with a second bonus game format (e.g., the bonus game format of FIGS. 19-21). In other words, in the embodiment, the gaming machine essentially has two or more different types of bonus games that the processor selects when a start-bonus outcome is achieved during the play of a basic game, but only one bonus game is available when a start-bonus outcome is achieved in each basic game session (both types of bonus games are not available during one session of a basic game). The CPU 16 may select among the various bonus game formats as a function of time, as a function of the number of wager inputs, or after determining which bonus game format is a favorite of the players based on the number of wager inputs.

FIG. 19 illustrates the initial bonus game screen that the player visualizes after achieving a bonus game outcome during the basic game when playing the basic game as shown in FIGS. 1-3. Specifically, once the start-bonus outcome is achieved, the DETECTIVE and the SIDEKICK are placed together in an event that simulates a typical life event. For example, as shown in FIG. 19, the relationship between the DETECTIVE and the SIDEKICK has become somewhat amorous in that these two characters will be going on a date. In this bonus game format, the player's first selectable option is to determine where the date will take place. The player can select from a Theater, an Ice Cream Shop, a Zoo, a City Park, or a Restaurant. Here, the player has selected the Restaurant.

In the first sequence of this simulated life event, as shown in FIG. 20, the DETECTIVE arrives to pick up the SIDEKICK in a vehicle to take her to the Restaurant. The vehicle is randomly chosen to be one of a variety of vehicles, each of which has a certain bonus value associated with it. For example, the DETECTIVE in FIG. 20 has arrived in an average mid-size car and receives a 5× bonus. Alternatively, the DETECTIVE could have arrived in a limousine, a minivan, a city bus, a motorcycle, or a taxi and received bonus points associated with the particular vehicle. In addition to the bonus for the car, the player may achieve additional bonus points based on the initial impression that is experienced by both the DETECTIVE and the SIDEKICK. As illustrated, thought bubbles regarding this first impression are adjacent to the DETECTIVE and the SIDEKICK, resulting in a 20× bonus and a 10× bonus, respectively.

This courting event then progresses and the DETECTIVE and the SIDEKICK are now at the Restaurant, as shown in FIG. 21. The player may select from several options by depressing touch keys or other player input devices associated with those options. Each one results in a certain reaction having an associated bonus. Here, the player has selected the button "Make a Move on Him" causing the SIDEKICK to caress the hand of the DETECTIVE. This has resulted in a positive reaction for both the SIDEKICK and the DETECTIVE as the DETECTIVE's thought bubble illustrates his dream of "Lover's Lane" and the SIDEKICK's thought bubbles reflect her dream of a house with a picket fence. Thus, additional bonuses of 15× and 20× have been achieved. Choosing other options may, however, have a drastically different result, leading to no bonus points or possibly the end of the bonus game. As an example, the player could have selected "Ask About His Family," at which time the SIDEKICK would have words reflecting this question appear from her mouth, possibly accompanied by an audible broadcast of the question to the player of the gaming machine. The DETECTIVE's answer to this question can be randomly chosen, and may include things such as "my parents are both serving time in the federal penitentiary for insurance fraud," which would result in a poor outcome for the player in this bonus game. Unlike the expressions of delight in the faces of FIG. 21, the faces of the DETECTIVE and SIDEKICK would, in this case, express embarrassment or disdain due to these uncomfortable and undesirable words that are spoken.

While not shown, this courting event may continue to various scenes where the two characters continue to interact. This bonus game may end with a final impression where the two characters end the date with a final impression that can include, for example, a wave, a handshake, a short kiss, a long kiss, or a wedding. Each would have an associated bonus value.

Once the bonus game of FIGS. 19-21 is complete, the gaming machine 10 returns to the basic game where the player may continue with another session of the basic game hoping to achieve another session of the bonus game. Depending on whether certain criteria has been met (e.g., the number of wager inputs equals a value stored in the memory 20 causing the CPU 16 to switch bonus game formats), the next bonus game that is played due to achieving a start-bonus outcome may be the bonus game in FIGS. 5-9, which has a different bonus game format. Further, the CPU 16 may selectively cycle between different bonus game formats.

The courting event described with respect to FIGS. 19-21 is just one possible simulation of a real life event that can be used for a bonus game. Other simulations of a real life event include characters planning for and going on a safari, characters planning for and going on a fishing trip. Additionally, one of the bonus game formats may have a theme that is indicative of a certain time (i.e., the time of day, a season, or a holiday), and the processor for the gaming machine chooses the bonus game format when this time occurs. As an example, the courting event described with respect to FIGS. 19-21 may be a bonus game format that is only available on or around Valentine's Day. And, because the invention relates to the gaming machine 10 having two or more bonus game formats that are selectively toggled by the CPU 16 based on certain times or events, numerous types of bonus game formats can be used, as well. Finally, while this aspect of the invention has been described relative to activating one of a plurality of bonus game formats during a certain time of operation of the basic game, two of more bonus game formats may be available at one time of operation and other bonus game formats maybe available at another time of operation. For example, three data sets for three bonus games A, B and C may be stored in the memory 20. During a first time period of operation of the basic game, the CPU 16 may enable bonus games A and B for activation if a start-bonus outcome is achieved. During a second time period of operation of the basic game, the CPU 16 may enable bonus games B and C for activation if a start-bonus outcome is achieved. During a third time period of operation of the basic game, the CPU 16 may enable bonus games A and C for activation if a start-bonus outcome is achieved. During a fourth time period of operation of the basic game, the CPU 16 may enable bonus games A, B and C for activation if a start-bonus outcome is achieved. During a fifth time period of operation of the basic game, the CPU 16 may enable only bonus game A for activation if a start-bonus outcome is achieved. During a sixth time period of operation of the basic game, the CPU 16 may enable none of the bonus games so that no activation is available. Thus, the CPU 16 may select a different group of one or more data sets corresponding to one or more bonus games to activate at different times of operation.

In addition to selecting among bonus game formats, altering the play content may include making no bonus game available during a certain time period of operation of the basic game, as mentioned in the previous paragraph. For example, when a casino desires to increase player through-put when casino attendance is high, the gaming machine may deactivate the ability to achieve a bonus game because the play of a bonus game session tends to take much longer than the play of a basic game session. Thus, during a certain time of the day or a certain day of the week (or a holiday), the gaming machine may move to a mode whereby no bonus game is achievable. Additionally, the deactivation of the bonus game mode may occur after a certain number of wager inputs. Once that certain criteria that led to the deactivation of the bonus game mode is no longer present, the gaming machine returns to allowing activation of the bonus game when a start-bonus outcome is achieved in the basic game. This change to the play content would be done in a manner that causes the payback percentage to remain substantially the same when the bonus game is deactivated.

While the present invention has been described with reference to one or more particular embodiments, those skilled in the art will recognize that many changes may be made thereto without departing from the spirit and scope of the present invention. For example, the basic game need not comprise a spinning reel slot machine game as illustrated in FIG. 1, but may comprise virtually any type of game of chance or skill or combination of games having outcomes (e.g., start-bonus outcomes) that trigger play of a bonus game on the video display 12. For example, the basic game may comprise a video poker or video blackjack game and, thus, altering of the poker or blackjack game may be to provide a holiday or seasonal theme. For example, the face cards of the deck may change to include a queen holding a candy cane or a king wearing a Santa hat. Other non-selectable background visual features (and audio features) can also change to reflect the holiday or season. The basic game itself may be implemented on the video display 12 or a separate video display. In embodiments where both the basic and bonus games are implemented in video, each game may be shown on the same video display 12. Each of these embodiments and obvious variations thereof is contemplated as falling within the spirit and scope of the claimed invention, which is set forth in the following claims.

What is claimed is:

1. A gaming system, comprising:

a gaming terminal having a display for displaying (i) a basic game having a plurality of symbols that indicate a randomly selected outcome selected from a plurality of outcomes, (ii) one of a first group of bonus games in response to a special event occurring during the basic game within a first time period, (iii) one of a second group of bonus games in response to the special event occurring during the basic game within a second time period, the second time period occurring after the first time period, and (iv) one of the first group of bonus games in response to the special event occurring during the basic game within a third time period, the third time period occurring after the second time period; and a controller coupled to the gaming terminal and operative to (i) associate the first group of bonus games with the basic game during the first time period, (ii) associate the second group of bonus games with the basic game during the second time period such that, during the second time period, the second group of bonus games can be played but the first group of bonus games cannot be played, and (iii) associate the first group of bonus games with the basic game during the third time period such that, during the third time period, the first group of bonus games can be played but the second group of bonus games cannot be played.

2. The system of claim 1, wherein, the first group of bonus games and the second group of bonus games include at least one common bonus game.

3. The system of claim 1, wherein the plurality of outcomes includes a bonus-triggering outcome, the special event occurring when the randomly selected outcome is the bonus-triggering outcome.

4. The system of claim 1, wherein the first time period transitions to the second time period at a certain time of the day.

5. The system of claim 1, wherein the first time period transitions to the second time period as a function of a number wager inputs.

6. The system of claim 1, wherein the first time period transitions to the second time period after a determination of a favorite bonus game.

7. The system of claim 1, wherein the controller is located external to the gaming terminal.

8. The system of claim 1, wherein the controller downloads data sets for the second group of bonus games to the gaming terminal to associate the second group of bonus games with the basic game during further time periods after the first time period and the second time period.

9. The system of claim 1, wherein the controller is operative to cycle between the first group of bonus games and the second group of bonus games.

10. A gaming system, comprising:

a gaming terminal having a display for displaying (i) a basic game having a plurality of symbols that indicate a randomly selected outcome selected from a plurality of outcomes, (ii) one of a first group of bonus games in response to a special event occurring during the basic game within a first time period, (iii) one of a second group of bonus games in response to the special event occurring during the basic game within a second time period, the second time period occurring after the first time period; and a controller coupled to the gaming terminal and operative to (i) associate the first group of bonus games with the basic game during the first time period, (ii) associate the second group of bonus games with the basic game during the second time period such that, during the second time period, the second group of bonus games can be played but the first group of bonus games cannot be played, and (iii) associate the first group and second group of bonus games with the basic game during a third period of time such that all bonus games from the first group and second group of bonus games can be played during the third period of time.

11. The system of claim 8, wherein the controller is further operative to access a memory device storing the data set for downloading the data sets, the memory device being located remotely from the gaming terminal.

12. A method of operating a wagering game having a basic game that provides access to at least a first bonus game and a second bonus game, comprising:

conducting, via a gaming terminal, the basic game during a first time period;

in response to a triggering event during play of the basic game within the first time period, conducting, via the gaming terminal, the first bonus game but not the second bonus game;

transitioning from the first time period to a second time period in response to predetermined criteria;

conducting, via the gaming terminal, the basic game during the second time period;

in response to the triggering event during play of the basic game within the second time period, conducting, via the gaming terminal, the second bonus game but not the first bonus game, the first bonus game being unavailable during the second time period;

transitioning from the second time period to a third time period;

conducting, via the gaming terminal, the basic game during the third time period; and in response to the triggering event during play of the basic game within the third time period, conducting, via the gaming terminal, the first bonus game but not the second bonus game, the second bonus game being unavailable during the third time period.

13. The method of claim 12, wherein the predetermined criteria is associated with wager inputs.

14. The method of claim 12, wherein the predetermined criteria is a certain time.

15. The method of claim 12, further including storing, in a memory device remote from the gaming terminal at which the wagering game is being played, a first data set and a second data set for producing, respectively, the first and second bonus games.

16. The method of claim 12, wherein the first bonus game is one of a first group of bonus games and the second bonus game is one of a second group of bonus games.

17. The method of claim 12, wherein each of the first and second bonus games have different bonus game formats, the different bonus game formats presenting different player-selectable options.

18. The method of claim 12, wherein the basic game includes a plurality of outcomes comprising at least one bonus-triggering outcome, the at least one bonus-triggering outcome being the triggering event.

19. The method of claim 13, wherein the predetermined criteria is a certain number of wager inputs.

20. The method of claim 13, wherein the predetermined criteria is a determination of a favorite bonus game based on a number of wager inputs.

21. The method of claim 15, further including downloading the first data set from the remote memory device to the gaming terminal, and downloading the second data set from the remote memory device to the gaming terminal.

22. The method of claim 17, wherein the different bonus game formats include bonus game themes indicative of a commonly known societal event.

23. A method of conducting a wagering game, the wagering game including a basic game and at least first, and second, and third bonus games, comprising:

storing, in at least one memory device, a plurality of data sets for producing a first group of bonus games, a second group of bonus games, and a third group of bonus games;

conducting the basic game at a gaming terminal during a first time period;

in response to a special event occurring during the basic game within the first time period, conducting one of the first group of bonus games at the gaming terminal;

transitioning from the first time period to a second time period based on predetermined criteria;

conducting the basic game at the gaming terminal during the second time period;

in response to a special event occurring during the basic game within the second time period, conducting one of the second group of bonus games at the gaming terminal, the first group of bonus games being unavailable to be conducted during the second time period;

transitioning from the second time period to a third time period;

conducting the basic game at the gaming terminal during the third time period; and in response to a special event occurring during the basic game within the third time period, conducting one of the third group of bonus games at the gaming terminal, the first group of bonus games and the second group of bonus games being unavailable to be conducted during the third time period.

24. The method of claim 23, wherein the basic game includes a plurality of outcomes comprising at least one bonus-triggering outcome, the special event within the first time period occurring when a randomly selected outcome in the basic game is the bonus-triggering outcome.

25. The method of claim 23, wherein the at least one memory device is located within a gaming terminal at which the wagering game is being played.

26. The method of claim 23, wherein the at least one memory device is located remotely from a gaming terminal at which the wagering game is being played.

27. The method of claim 23, wherein the predetermined criteria is associated with wager inputs.

28. The method of claim 23, wherein the predetermined criteria is a certain time.

29. The method of claim 27, further including downloading, from the remote memory device to the gaming terminal, the data sets for producing the second group of bonus games to be played during the second time period.

30. The method of claim 27, wherein the predetermined criteria is a certain number of wager inputs.

31. The method of claim 27, wherein the predetermined criteria is a determination of a favorite bonus game based on a number of wager inputs.

32. A gaming system, comprising:

at least one input device;

at least one display device;

at least one processor; and at least one memory device which stores a plurality of instructions which, when executed by the at least one processor, cause the at least one processor to operate with the at least one display device and the least one input device to:

receive wagers from a player to play a wagering game having a basic game that provides access to at least a first bonus game and a second bonus game;

display the plays of the basic game on the at least one display device during a first time period;

in response to a triggering event during a play of the basic game within the first time period, display the play of a first bonus game on the at least one display device;

display the plays of a the basic game on the at least one display device during a second time period that occurs after the first time period;

in response to the triggering event during a play of the basic game within the second time period, display the play of a second bonus game on the at least one display device, the first bonus game being unavailable for play during the second time period;

display the plays of the basic game on the at least one display device during a third time period that occurs after the second time period; and in response to the triggering event during a play of the basic game within the third time period, display the play of a third bonus game on the at least one display device, the first bonus game and the second bonus game being unavailable for play during the third time period.

33. The gaming system of claim 32, wherein the first time period transitions to the second time period based on a certain number of wager inputs.

34. The gaming system of claim 32, wherein the first time period transitions to the second time period based on a determination of a favorite bonus game.

35. The gaming system of claim 32, wherein the first time period transitions to the second time period at a certain time.

36. The gaming system of claim 32, wherein the plurality of instructions further cause the at least one processor to download, from a remote memory device, a first data set corresponding to the first bonus game and a second data set corresponding to the second bonus game.

* * * * *